United States Patent
Kim et al.

(10) Patent No.: US 10,146,354 B2
(45) Date of Patent: Dec. 4, 2018

(54) MOBILE TERMINAL AND CONTROLLING METHOD THEREOF

(71) Applicant: LG ELECTRONICS INC., Seoul (KR)

(72) Inventors: Sangwon Kim, Seoul (KR); Jeongyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/600,935

(22) Filed: Jan. 20, 2015

(65) Prior Publication Data

US 2016/0098137 A1    Apr. 7, 2016

(30) Foreign Application Priority Data

Oct. 2, 2014 (KR) ........................ 10-2014-0133291

(51) Int. Cl.
| | | |
|---|---|---|
| G06F 3/041 | (2006.01) |
| G06F 1/16 | (2006.01) |
| G06F 3/0485 | (2013.01) |
| G06F 3/0346 | (2013.01) |
| G06F 3/0488 | (2013.01) |
| H04M 1/725 | (2006.01) |

(52) U.S. Cl.
CPC ............ *G06F 3/0416* (2013.01); *G06F 1/163* (2013.01); *G06F 1/1643* (2013.01); *G06F 1/1694* (2013.01); *G06F 3/0346* (2013.01); *G06F 3/0412* (2013.01); *G06F 3/0485* (2013.01); *G06F 3/04883* (2013.01); *G06F 3/04886* (2013.01); *H04M 1/72583* (2013.01); *G06F 2203/0381* (2013.01)

(58) Field of Classification Search
None
See application file for complete search history.

(56) References Cited

U.S. PATENT DOCUMENTS

| 9,690,476 B2 * | 6/2017 | Shirzadi ............. G06F 3/04883 |
| 2011/0157046 A1 * | 6/2011 | Lee ..................... G04G 21/08 345/173 |
| 2012/0084675 A1 * | 4/2012 | Sirpal .................. G06F 1/1616 715/761 |
| 2012/0131497 A1 * | 5/2012 | Jitkoff .................. G06F 3/0481 715/786 |
| 2012/0240071 A1 * | 9/2012 | Park ..................... G06F 3/0488 715/769 |
| 2013/0154951 A1 * | 6/2013 | Laibowitz ............ G06F 3/0488 345/173 |

(Continued)

FOREIGN PATENT DOCUMENTS

| EP | 2 150 031 A1 | 2/2010 |
| EP | 2 161 645 A2 | 3/2010 |

*Primary Examiner* — Jose Soto Lopez
(74) *Attorney, Agent, or Firm* — Birch, Stewart, Kolasch & Birch, LLP

(57) ABSTRACT

A mobile terminal including a wireless communication unit configured to provide wireless communication; a touchscreen; a motion sensor configured to detect a motion of the mobile terminal; and a controller configured to receive a touch input through the touchscreen in combination with a rotation of the mobile terminal detected through the motion sensor, and execute a specific function on the mobile terminal corresponding to the combination of the touch input and the rotation of the mobile terminal.

18 Claims, 34 Drawing Sheets

(56) References Cited

U.S. PATENT DOCUMENTS

| | | | | |
|---|---|---|---|---|
| 2014/0098061 A1* | 4/2014 | Huang | ............... | G06F 3/04845 |
| | | | | 345/174 |
| 2014/0160078 A1* | 6/2014 | Seo | ..................... | G06F 3/017 |
| | | | | 345/175 |
| 2014/0210744 A1* | 7/2014 | Song | ................. | G06F 3/03545 |
| | | | | 345/173 |
| 2014/0320434 A1* | 10/2014 | Pantel | ................... | G06F 3/017 |
| | | | | 345/173 |
| 2014/0375579 A1* | 12/2014 | Fujiwara | ............... | G06F 3/041 |
| | | | | 345/173 |
| 2015/0046838 A1* | 2/2015 | Sano | .................... | G06Q 50/01 |
| | | | | 715/752 |
| 2016/0112667 A1* | 4/2016 | Park | .................... | G06F 1/1601 |
| | | | | 348/739 |
| 2016/0202884 A1* | 7/2016 | Ohki | ................. | G06F 3/04883 |
| | | | | 715/784 |

* cited by examiner

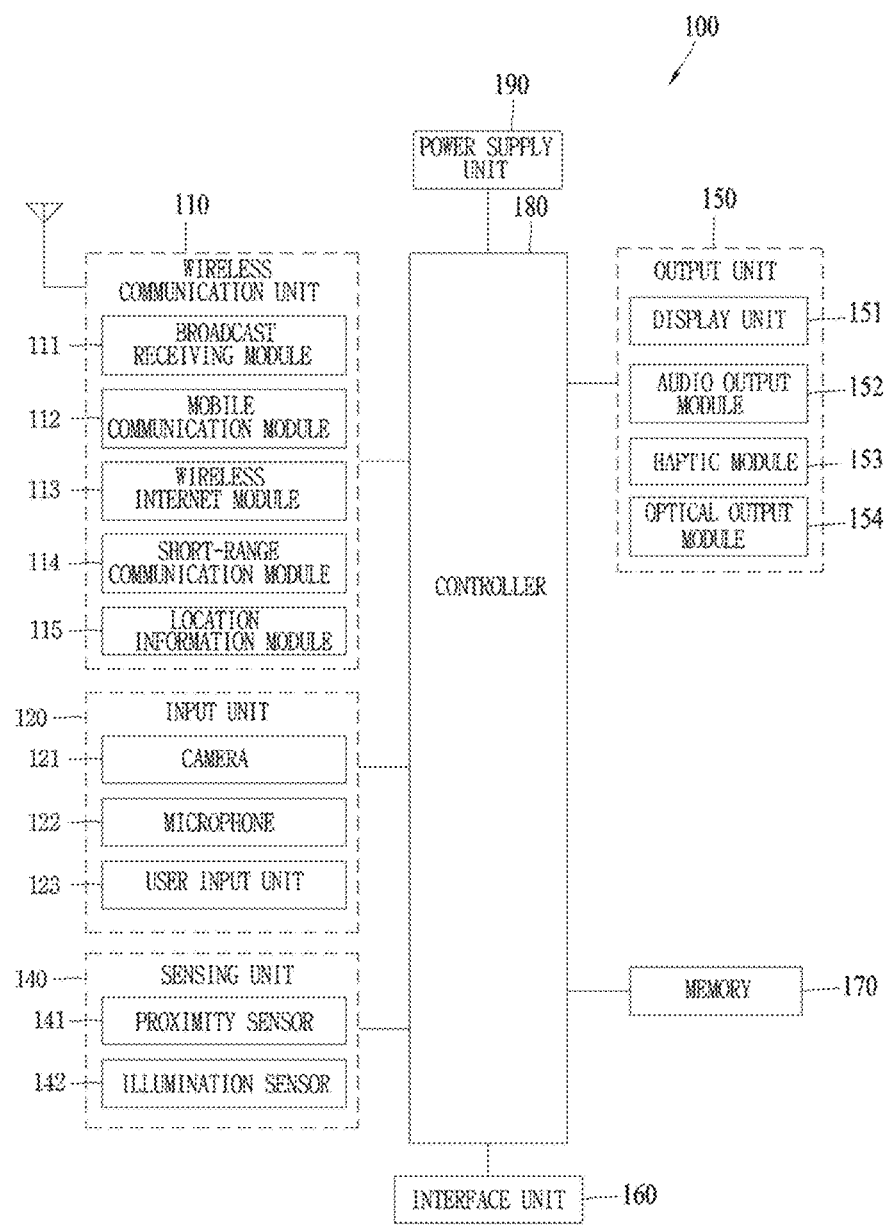

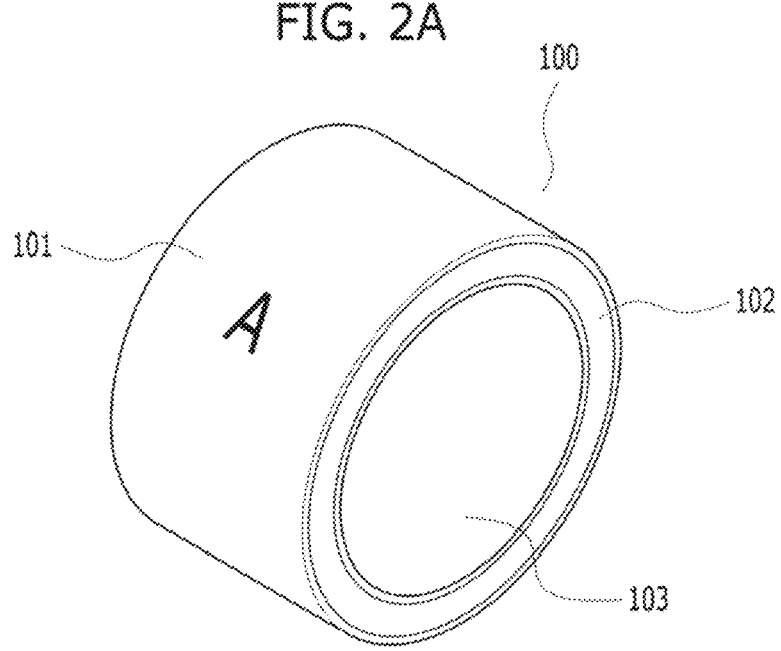

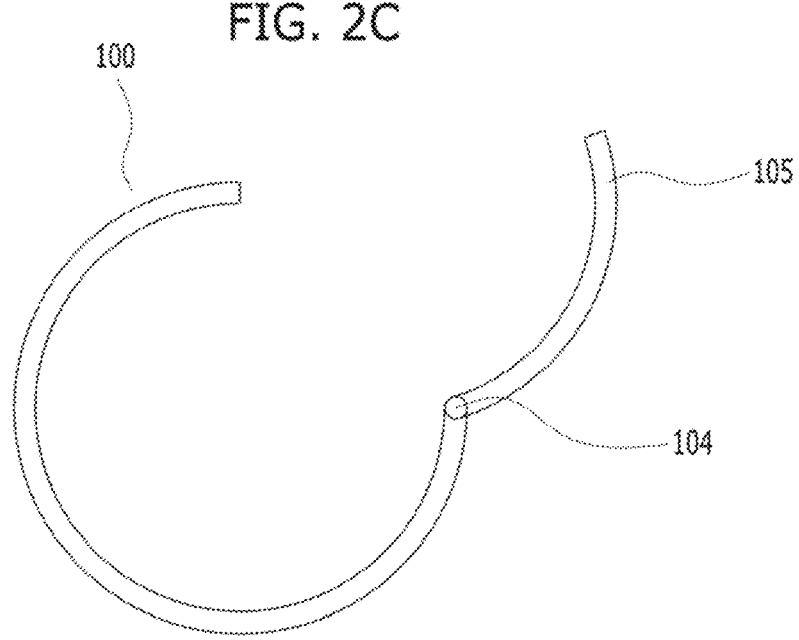

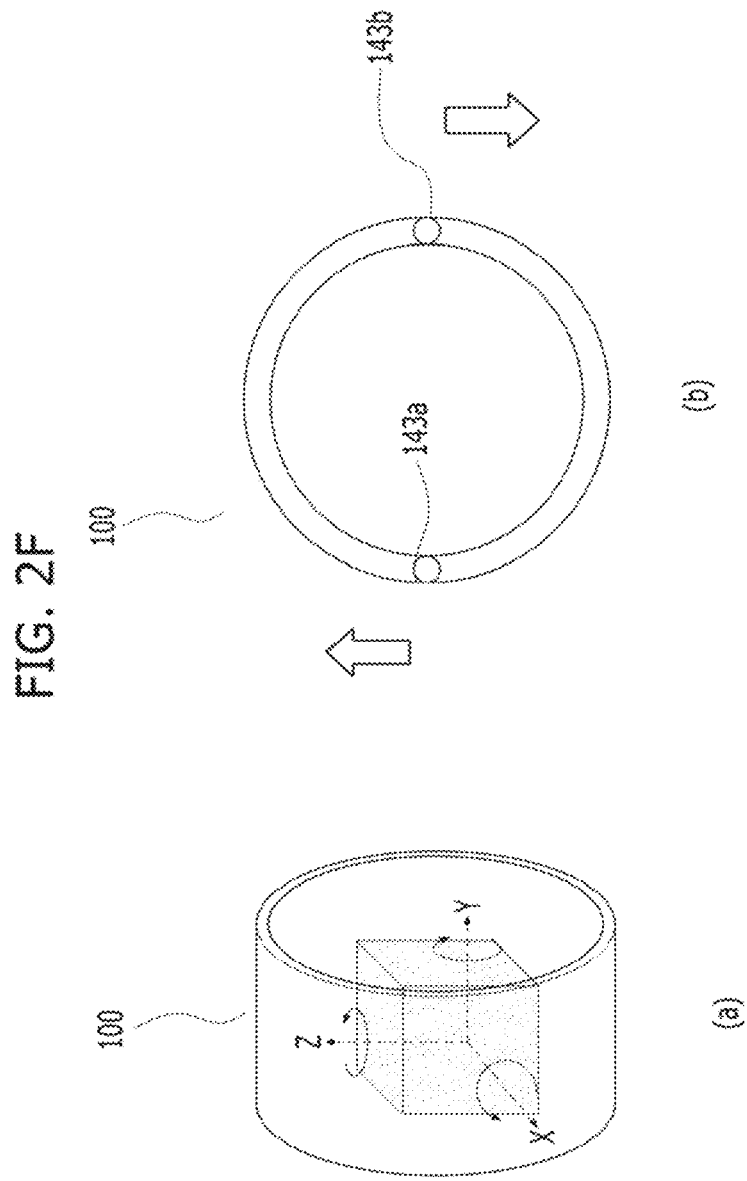

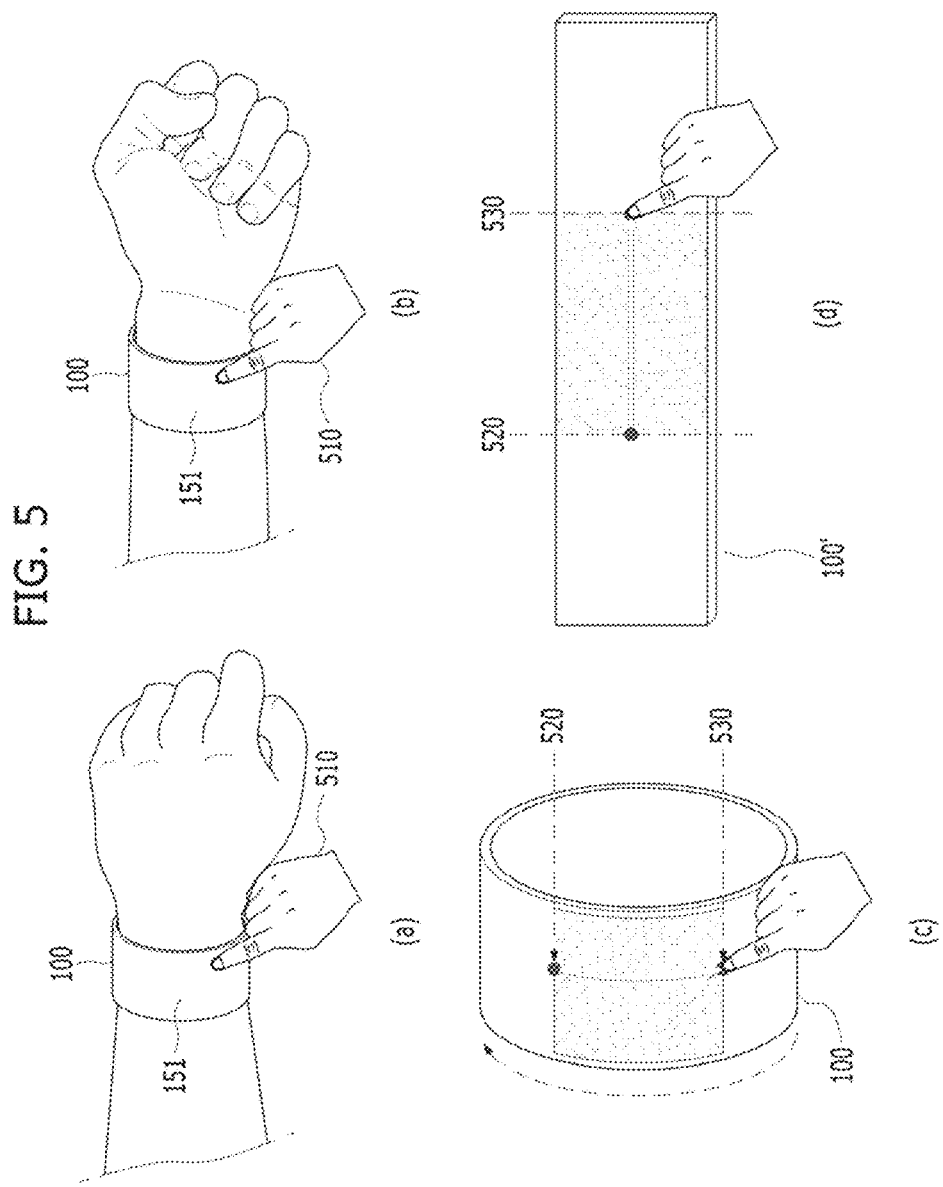

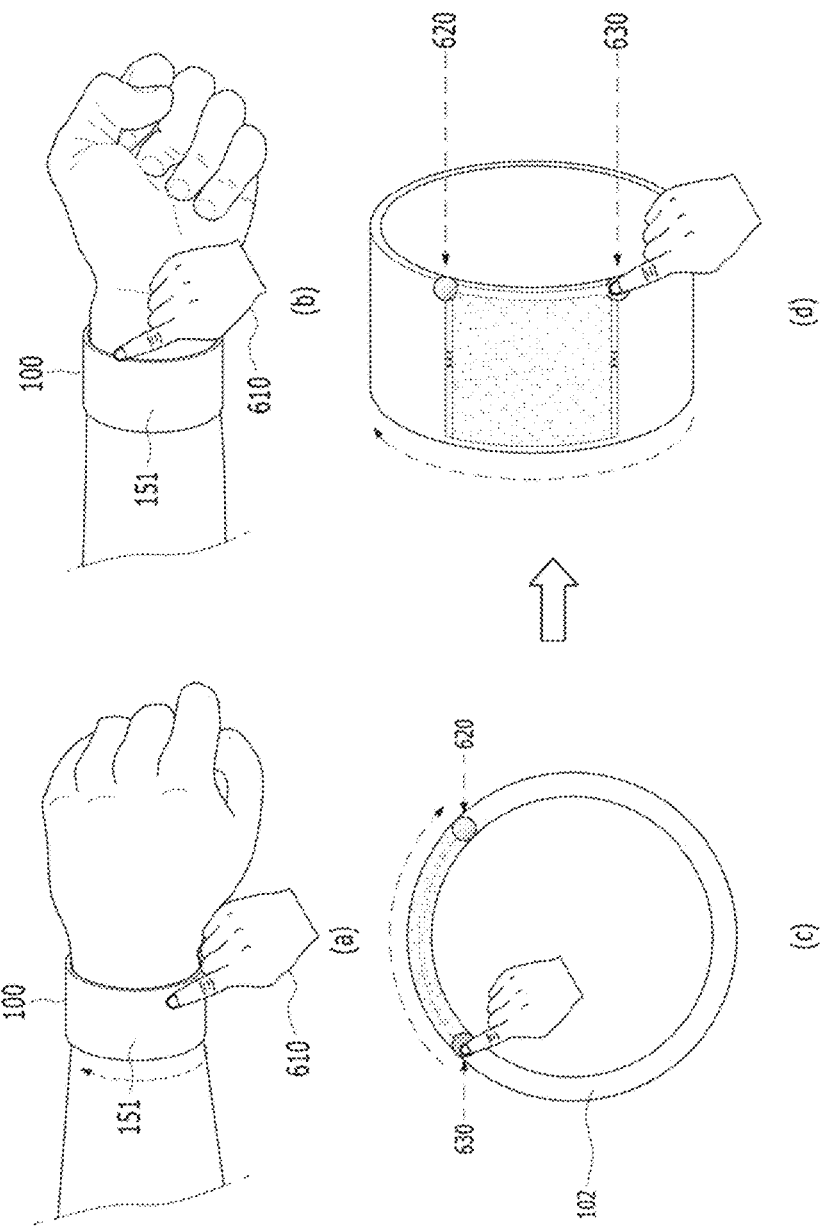

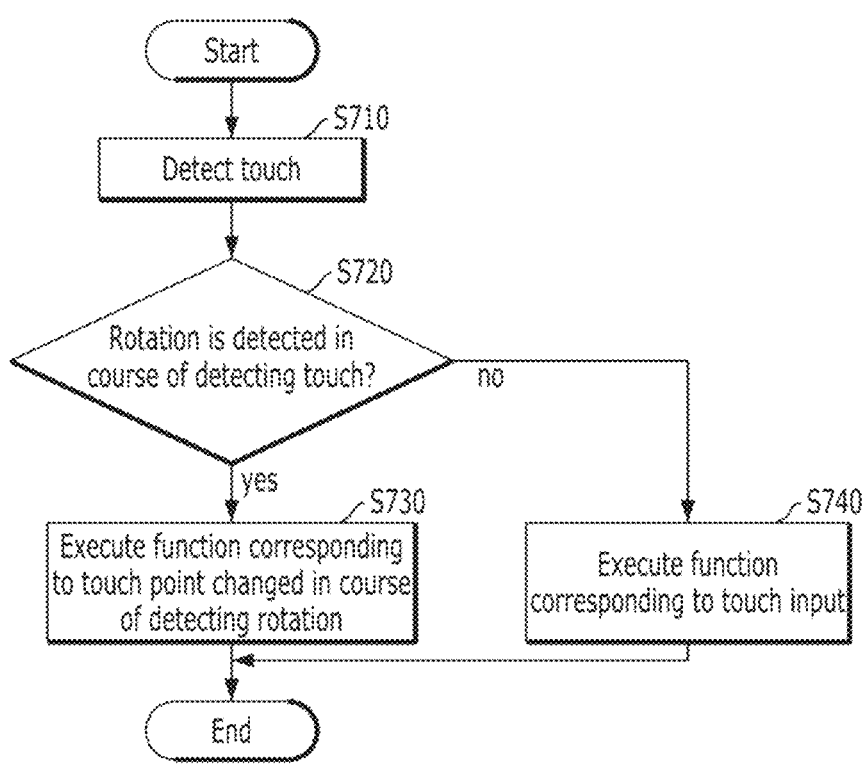

FIG. 16
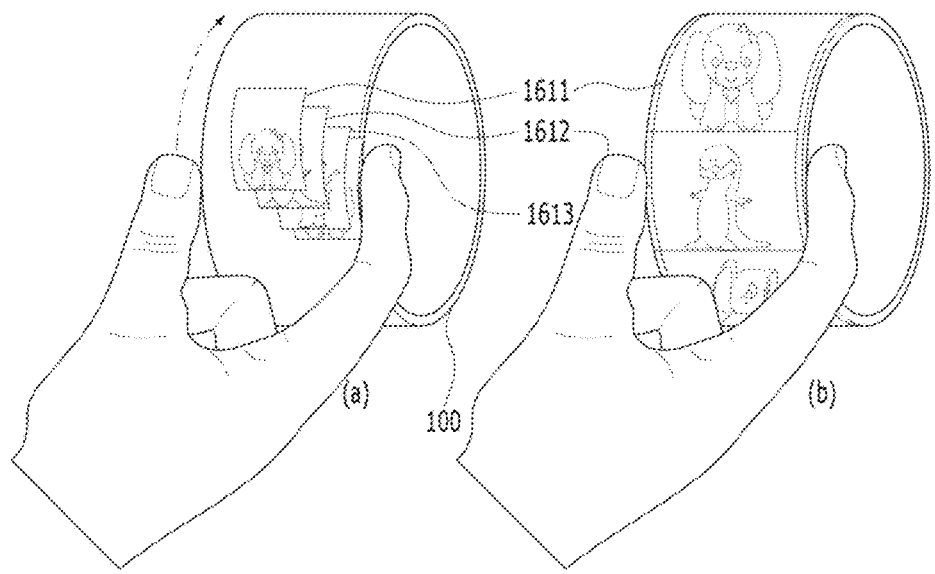
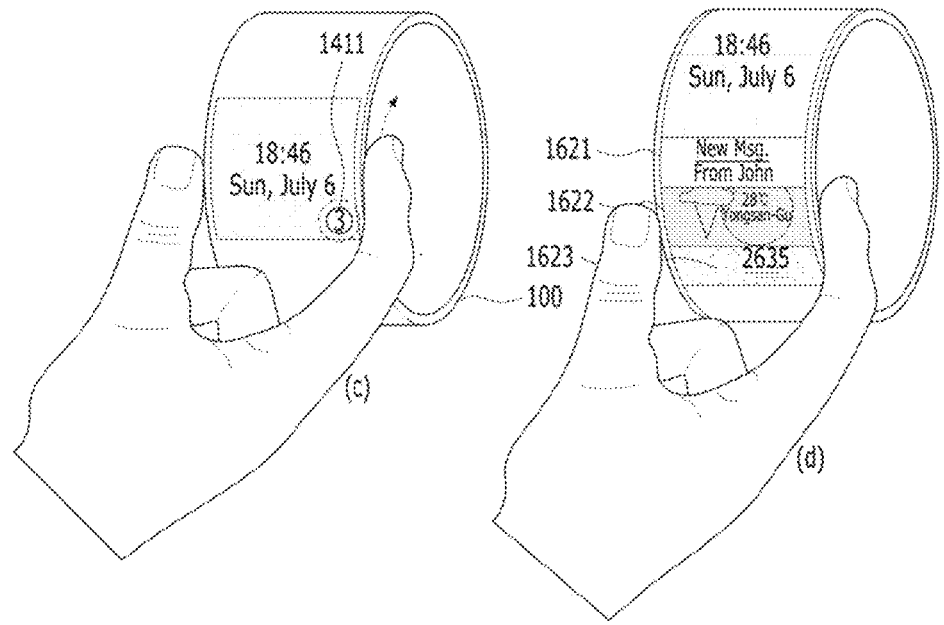

FIG. 17
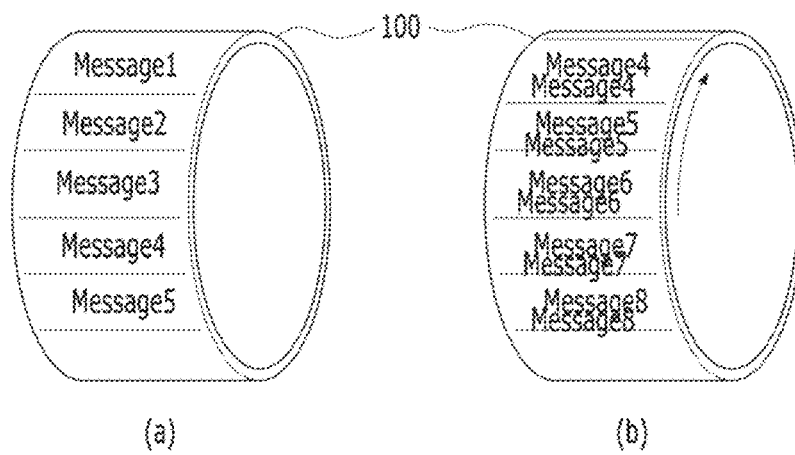
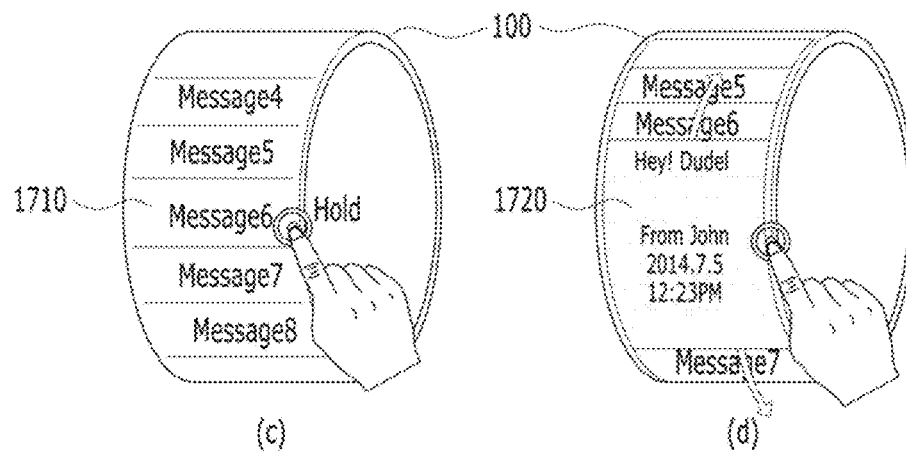

FIG. 19
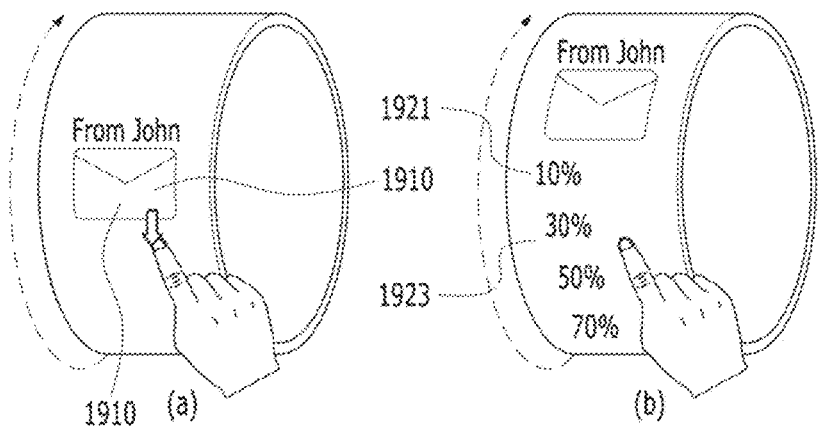
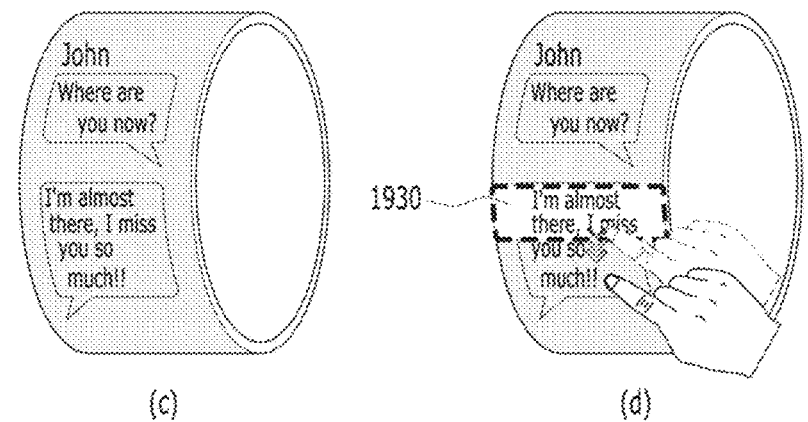

FIG. 25
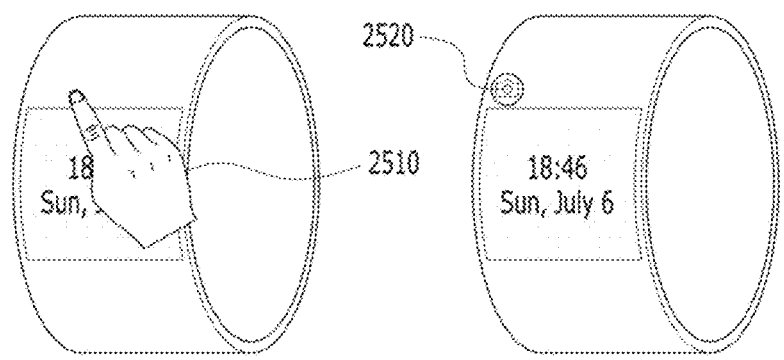
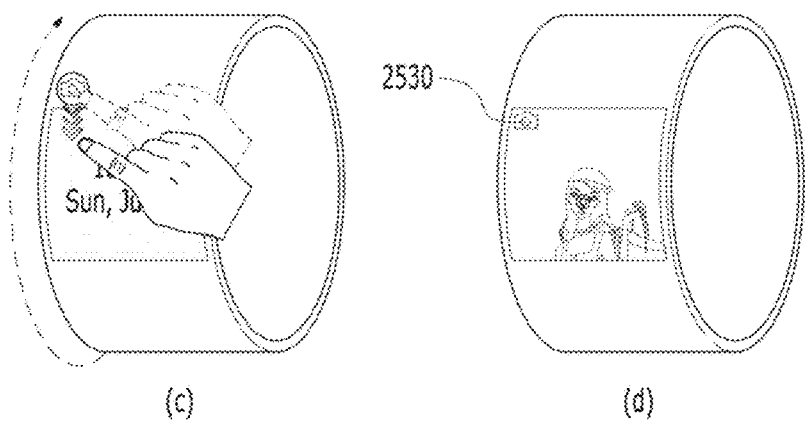

MOBILE TERMINAL AND CONTROLLING METHOD THEREOF

Pursuant to 35 U.S.C. § 119(a) this application claims the benefit of earlier filing date and right of priority to Korean Application No. 10-2014-0133291, filed on Oct. 2, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof Although the present invention is suitable for a wide scope of applications, it is particularly suitable for providing various functions by combining a motion of a wearable type mobile terminal put on a rotatable body part of a user with a touch input.

Discussion of the Related Art

Generally, terminals can be classified into mobile/portable terminals and stationary terminals. The mobile terminals can be further classified into handheld terminals and vehicle mounted terminals. As functions of the terminal are becoming diversified, the terminal is implemented as a multimedia player provided with composite functions such as photographing of photos or videos, playback of music or video files, game play, broadcast reception and the like for example.

Recently, a mobile terminal of a wearable type placed on a user's body attracts a lot of attention. However, a method of inputting a command to a wearable device is generally limited to a key button input or a touch input to a touchscreen.

SUMMARY OF THE INVENTION

Accordingly, one object of the present invention is directed to a mobile terminal and controlling method thereof that substantially obviate one or more problems due to limitations and disadvantages of the related art.

An object of the present invention is to provide a wearable type mobile terminal and controlling method thereof, by which a user is provided with more convenient functions.

In particular, one object of the present invention is to provide a wearable type mobile terminal and controlling method thereof, by which various commands can be input by combining a motion of the mobile terminal with a touch input.

Another object of the present invention is to provide a wearable type mobile terminal and controlling method thereof, by which a privacy protective function can be further reinforced.

To achieve these objects and other advantages and in accordance with the purpose of the invention, as embodied and broadly described herein, a mobile terminal according to one embodiment of the present invention may include a touchscreen, a motion sensor configured to detect a motion of the mobile terminal, and a controller, if a touch input is detected through the touchscreen and a rotation is detected through the motion sensor in the course of maintaining the touch input, controlling a function corresponding to the touch input and the rotation to be executed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to one embodiment of the present invention;

FIGS. 2A to 2G are diagrams illustrating examples of a configuration of a mobile terminal applicable to embodiments of the present invention;

FIG. 5 is a diagram illustrating one example of a process for detecting both a touch input and a motional state change in a mobile terminal according to one embodiment of the present invention;

FIG. 6 is a diagram illustrating another example of a process for detecting both a touch input and a motional state change in a mobile terminal according to one embodiment of the present invention;

FIG. 7 is a diagram illustrating one example of an operating process in accordance with simultaneous detections of a touch and rotation in a mobile terminal according to one embodiment of the present invention;

FIG. 16 is a diagram illustrating another example of a process for performing a scroll in a mobile terminal according to one embodiment of the present invention;

FIG. 17 is a diagram illustrating a further example of a process for performing a scroll in a mobile terminal according to one embodiment of the present invention;

FIG. 19 is a diagram illustrating one example of a process for providing a privacy protective function in a mobile terminal according to one embodiment of the present invention;

FIG. 25 is a diagram illustrating one example of a method of running a bookmarked application in a mobile terminal according to one embodiment of the present invention.

DETAILED DESCRIPTION OF THE INVENTION

Figure 2B:
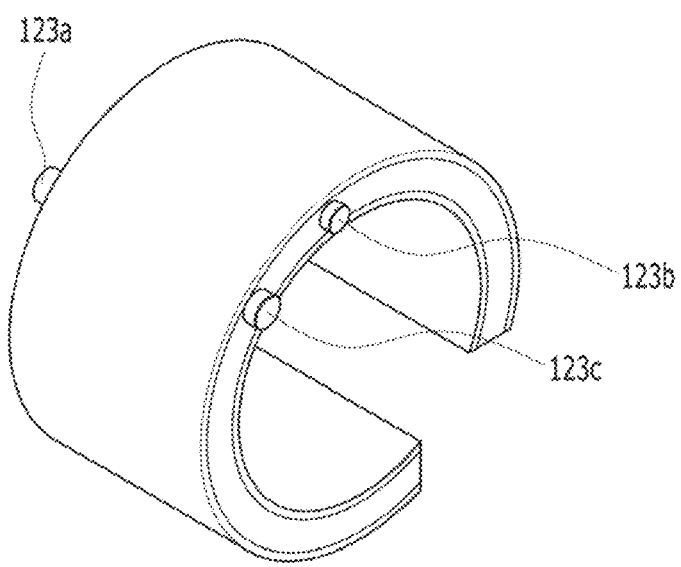

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help understand various technical features and the embodiments presented herein are not limited by the accompanying drawings. As such, the present invention should be construed to extend to any alterations, equivalents and substitutes in addition to those which are particularly set out in the accompanying drawings.

A mobile terminal described in the present specification includes a wearable type mobile terminal placed on a user's body and is preferably worn around a body part (e.g., a wrist, an upper arm, a head, etc.) capable of naturally receiving a touch input with a wearer's hand of a pointer gripped with the hand by rotating along at least one rotational axis of the user's body. As examples of such mobile terminal, there are a bangle type terminal (e.g., a smartbangle), a watch type terminal (e.g., a smartwatch), a glasses type terminal (e.g., smart glasses), a head mounted display (HMD) and the like.

FIG. 1 is a block diagram of a mobile terminal in accordance with an embodiment of the present invention. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively he implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (tbr example, a touch key, a push key, a mechanical key, a son key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RUB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few, The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form pan of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE) LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example. WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors. in a video or image capture mode. The processed image frames can he displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can he processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Next, FIGS. 2A to 2G are diagrams illustrating examples of a configuration of a mobile terminal applicable to embodiments of the present invention. Referring to FIG. 2A, an exterior of a bangle type mobile terminal is illustrated. A mobile terminal 100 includes a case (e.g., a frame, a housing, a cover, etc.) configuring an exterior. The mobile terminal 100 may include a front case 101 configuring an outer circumference and an inner case 103 configuring an inner circumference.

Various electronic parts are installed in an inner space formed by a combination of the front case 101 and the inner case 103. A side case 102 may he additionally provided between the front case 101 and the inner case 103 to configure a. lateral face. The side case 102 can be built in one body with one of the front case 101 and the inner case 103 instead of being separately provided from each attic front case 101 and the inner case 103.

A display unit 151 is provided to a front face of the front ease 101 to output an information 'A'. In particular, the display unit 151 is installed on the front case 101 to configure a front case (i.e., an outer circumference) of a terminal body together with the front case 101. The display 151 may be provided along the outer circumference, may be exposed on the front case 101 through a window, or may be built in under the front case 101 formed of a transparent material. Moreover, the display 151 may be provided to a partial region of the outer circumference if necessary or may be provided to occupy most of the outer circumference. Thus, the display 151 can be implemented with a flexible display. In addition, the display 151 may be implemented with an OLED material to activate a part required for an information display only for power saving.

The flexible display unit is a type of a display that is deformable by an external force. This deformation, which includes the flexible display unit, may include any of curving, bending, folding, twisting, rolling, and combinations thereof. In some implementations, the flexible display unit may include a general flexible display, electronic paper (also known as e-paper), and combinations thereof. In general, the flexible display is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

Meanwhile, if an edge of the outer circumference is bent to be connected to the lateral face with a curved surface, an edge of the display unit is configured in a curved surface along the edge of the outer circumference to be extended to at least one portion of the lateral face. Moreover, the display unit may include a touchscreen by being built in one body with a touch sensor. In addition, a separate touch sensor may be additionally provided along the side case 102.

In some embodiments, electronic components may also be mounted to the inner case 103. Examples of such electronic components include a detachable battery, an identification module, a memory card, and the like. A rear cover configured to cover the electronic components may be detachably coupled to the inner case 103. Therefore, when the rear cover is detached from the inner case 103, the electronic components mounted to the inner case 103 are externally exposed.

The cases 101, 102 and 103 may be formed by injection-molding synthetic resin or may be formed of a metal, for example, stainless steel (STS), aluminum (Al), titanium (Ti), or the like. As an alternative to the example in which a plurality of cases form an inner space for accommodating components, the mobile terminal 100 may be configured such that one case forms the inner space. In this example, a mobile terminal 100 having a unibody is formed so synthetic resin or metal extends from a side surface to an inner circumference.

If desired, the mobile terminal 100 may include a waterproofing unit for preventing introduction of water into the terminal body. For example, the waterproofing unit may include a waterproofing member which is located between the window and the front case 101, between the front case 101 and the side case 102, or between the side case 102 and the inner cover 103, to hermetically seal an inner space when those cases are coupled.

The proximity sensor 141, the illumination sensor 142, the optical output unit 154, the camera 121 and the like can be arranged on the front case. In addition, the manipulation unit 123, the microphone 122, the interface unit 160 and the like can be arranged on the lateral face of the terminal body. The configurations of the above components are non-limited by the above-mentioned arrangements. The configurations may be excluded, replaced, or arranged on other faces if necessary.

The display unit 151 is generally configured to display (or output) information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting. diode (OLED), a flexible display, a 3-dimensional (3D) display, an e-ink display, and combinations thereof.

The display unit 151 may be implemented along the outer circumference using two display devices. For instance, a plurality of the display units 151 may be arranged on the outer circumference, either spaced apart from each other, or these devices may be integrated. The display unit 151 may also include a touch sensor, which senses a touch input received at the display unit, in order to receive an input of a control command by a touch technique. When a touch is input to the display unit 151, the touch sensor may be configured to sense this touch and the controller 180, for example, may generate a control command or other signal corresponding to the touch. The content which is input by the touch technique may be a text, a numeral, a menu item which can be indicated or designated in various modes, or the like.

The touch sensor may be configured in a form of a film having a touch pattern, disposed between a window (not shown in the drawing) and a display (not shown in the drawing) on a backside of the window, or a metal wire which is patterned directly on the backside of the window. Alternatively, the touch sensor may be integrally formed with the display. For example, the touch sensor may be disposed on a substrate of the display or within the display. Thus, the display unit 151 may also form a touchscreen together with the touch sensor. In this instance, the touchscreen may serve as the user input unit 123 (see FIG. 1).

The optical output module 154 can be configured to output light for indicating an event occurrence. Examples of such events include a message reception, a call signal reception, a missed call, an alarm, a schedule notice, an email reception, an information reception through an application, and the like. If the controller 180 detects that a user has checked the corresponding event, the controller 180 can control the optical output unit 154 to stop the light output.

The camera 121 can process image frames such as still or moving images obtained by the image sensor in a capture mode or a video call mode. The processed image frames can be then displayed on the display unit 151 or saved in the memory 170. The microphone 122 is configured to receive an input of a user's voice and/or other sounds. In particular, a plurality of microphones 122 are provided to a plurality of places to receive an input of stereo sound.

The interface unit 160 serves as a passage for connecting the mobile terminal 100 to an external device. For instance, the interface unit 160 may include at least one of a contact terminal for a connection to another device (e.g., an earphone, an external speaker, etc.), a port (e.g., IrDA port, Bluetooth port, Wireless LAN port, etc.) for a short range communication, a power supply terminal for supplying a power to the mobile terminal 100, and the like. The interface unit 160 can be implemented into a socket for receiving an external card such as a user identity module (UIM), a subscriber identity module (SIM), a memory card for information storage, and the like.

At least one antenna for wireless communication may be provided to the terminal body. The antenna may be installed in the terminal body or formed in the case. For example, the antenna which configures a part of the broadcast receiving module 111 may be configured retractable into the terminal body. Alternatively, the antenna may be formed using a film attached to an inner lateral surface of the inner case 103. Alternatively, a case containing a conductive material can be configured to play a role as the antenna.

A power supply unit 190 (cf. FIG. 1) for supplying a power to the mobile terminal 100 is provided to the terminal body. The power supply unit 190 may include a battery 191, which is built in the terminal body or configured externally detachable from the terminal body. The battery 191 may be configured to be supplied with a power through a power cable connected to the interface unit 160, Also, the battery 191 can be charged by wireless using a wireless charger. The wireless charging may be implemented by magnetic induction or resonance (electromagnetic resonance).

Referring to FIG. 2B, in order for a user to wear the mobile terminal easily, at least one portion of the mobile terminal body can be configured to open. In addition, a plurality of manipulation units 123*a*, 123*b* and 123*c* can be provided to a lateral face of the mobile terminal. These manipulation units are examples of the user input unit 123, which may be manipulated by a user to apply a command for controlling an operation of the mobile terminal 100 and can be commonly called a manipulating portion. Each of the manipulation units may employ any tactile manners that allow the user to perform manipulations such as touch, push, scroll, or the like by experiencing a tactile feeling.

Each of the manipulation units may also employ any non-tactile manners that allow the user to perform manipulation such as proximity touch, hovering, or the like without experiencing a tactile feeling. Moreover, when the manipulation units are provided to the lateral face, it is a matter of course that a touch sensor can be provided to the lateral face. In particular, in consideration of the touch sensor provided to one lateral face, the manipulation units can be provided to the other lateral face only. Alternatively, the touch sensor may not be provided to a portion of a prescribed lateral face adjacent to a manipulation unit located region. On the contrary, the touch sensor may be provided to the whole lateral face except the manipulation unit arranged location.

Contents input by the manipulation units can be set in various ways. For instance, the first manipulation unit 123*a* receives an input of a command such as menu, home key, cancel, search and the like. The second and third manipulation units 123*b* and 123*c* can receive a command for adjusting a level of an audio output from the audio output unit 152, a command for switching a touch recognition mode of the display unit 151, and the like.

Figure 2D:
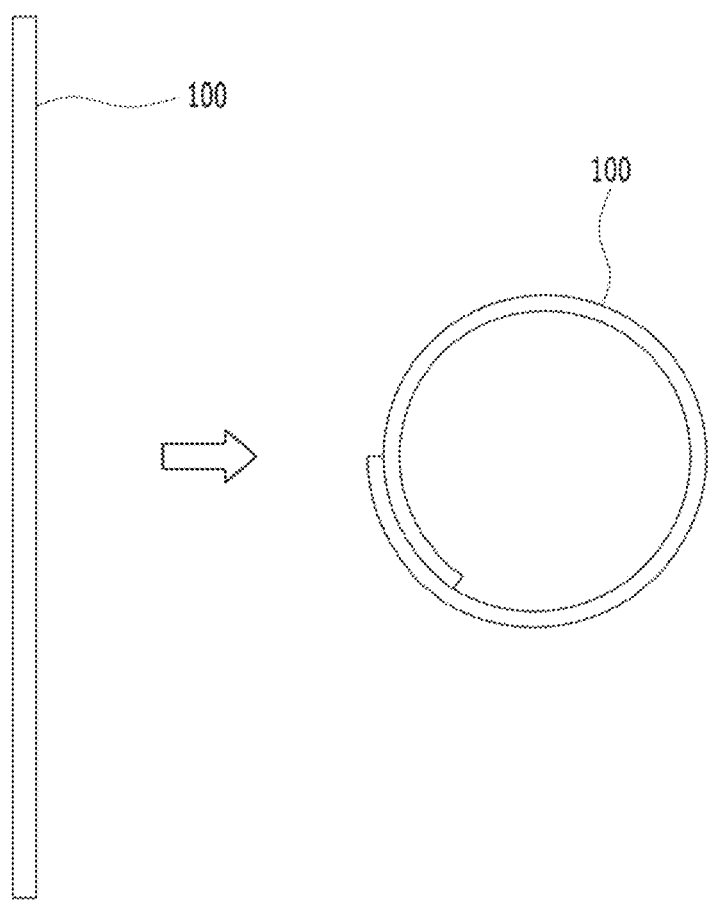
Figure 2E:
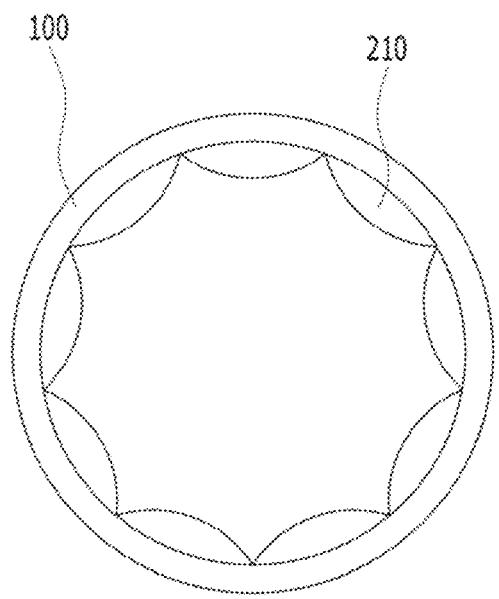

Referring to FIG. 2C, in order for a user to wear the mobile terminal 100 easily and conveniently, a hinge part 104 can be provided to the mobile terminal 100 so that a portion 105 of the mobile terminal 105 can be open/closed by being rotated. Referring to FIG. 2D, as a mobile terminal body is configured with a flexible material, the mobile terminal 100 can be implemented so as to twine around a user's body. In particular, the mobile terminal body is configured flat, as shown in a left part of the drawing, and is then rolled up to fit a user's wearing part on which the mobile terminal is worn, as shown in a right part of the drawing. In this instance, a display preferably includes a flexible display.

Meanwhile, a rotational direction of a wearing part and an extent of a corresponding rotation are preferably reflected by the mobile terminal according to an embodiment of the present invention. In particular, the mobile terminal is fixed to the wearing part to have the same motional state of a user's wearing body part. Hence, referring to FIG. 2E, a plurality of antislip pads 210 formed of antislip material (e.g., rubber, silicon, fabrics, etc.) can be provided along the inner circumference of the mobile terminal. The antislip pads 210 may be arranged in various intervals, thickness and materials. In addition, each of the antislip pads 210 may be filled with an elastic material capable of compression and restoration so as to be flexibly worn on a circumference of the wearing part.

According to the embodiments of the present invention mentioned in the following description, a motional state of a mobile terminal works as one element of a significant command input method. Hence, the mobile terminal according to an embodiment of the present invention is preferably provided with at least one acceleration sensor or at least one gyro sensor to determine a motional state of its own. If such a sensor is provided, referring to FIG. 2F(a), the mobile terminal can determine its own motion by discriminating the motion using 3 axes.

In order to accurately determine a motional state of a mobile terminal, a plurality of sensors can he located differently. For instance, referring to FIG. 2F(b), a pair of sensors 143*a* and 143*b* can be provided to the mobile terminal body in directions opposing each other, respectively. In this instance, a rotation centering on the Y-axis shown in FIG. 2F(a) can be detected accurately. In particular, if a motional direction detected by the first sensor 143*a* is opposite to a motional direction detected by the second sensor 143*b*, the mobile terminal can be determined as currently rotating centering on the Y-axis. Further, if a motional direction detected by the first sensor 143*a* is equal to a motional direction detected by the second sensor 143*b*, the mobile terminal can be determined as currently moving in parallel. For higher accuracy, more than 2 sensors can be provided to the mobile terminal.

Figure 2G:
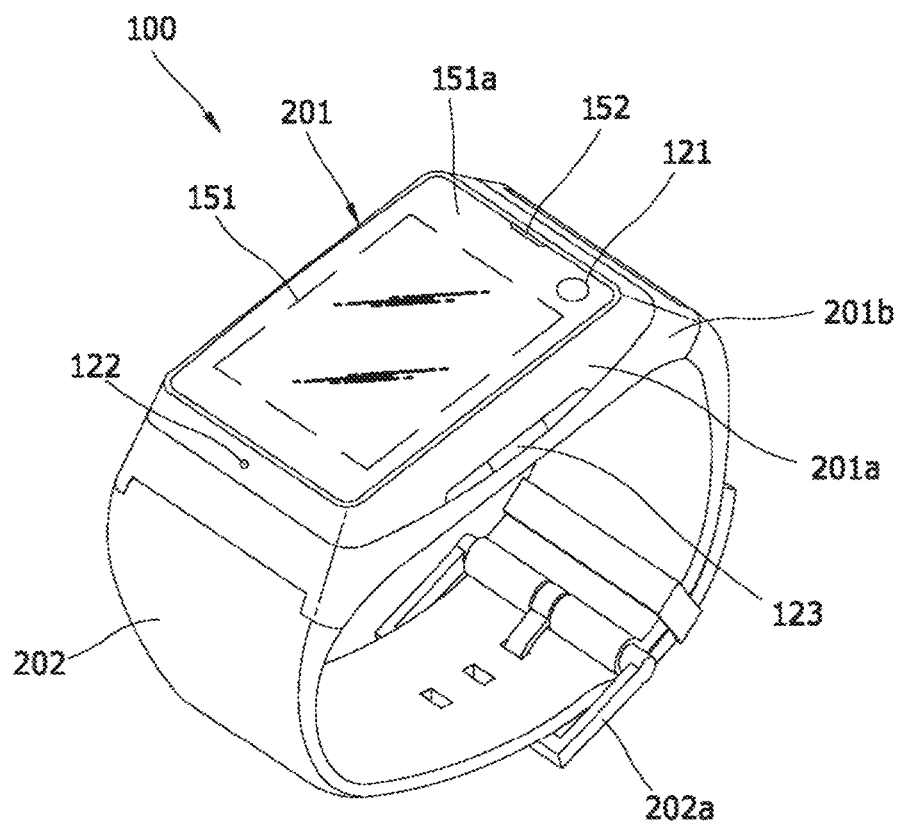

Meanwhile, a mobile terminal according to an embodiment of the present invention may be a watch type mobile terminal shown in FIG. 2G. Referring to FIG. 2G, a mobile terminal 100 of a watch type includes a body 201 having a touchscreen 151 and a band 202 configured to be wearable on a wrist by being connected to the body 201.

The body 201 includes a case configuring an exterior. In particular, the case may include a first case 201a and a second case 201b configured to form an inner space for accommodating various electronic components, by which the present invention is non-limited. For instance, the mobile terminal 100 can be implemented as a uni-body in a manner that a single case forms the inner space. In this instance, the various electronic components included in the case may be configured to perform the functions equal or similar to those of at least one portion of the former components described with reference to FIG. 1. For instance, the controller is provided to the watch type mobile terminal. If necessary, the wireless communication unit, the interface unit, the memory and the like can be included in the watch type mobile terminal.

The watch-type mobile terminal 100 can perform wireless communication, and an antenna for the wireless communication can be installed in the main body 201. The antenna may extend its function using the case. For example, a case including a conductive material may be electrically connected to the antenna to extend a ground area or a radiation area.

The display unit 151 is shown located at the front side of the main body 201 so that displayed information is viewable to a user. In some embodiments, the display unit 151 includes a touch sensor so that the display unit can function as a touch screen. As illustrated, window 151a is positioned on the first case 201a to form a front surface of the terminal body together with the first case 201a.

The illustrated embodiment includes audio output module 152, a camera 121, a microphone 122, and a user input unit 123 positioned on the main body 201. When the display unit 151 is implemented as a touch screen, additional function keys may be minimized or eliminated. For example, when the touch screen is implemented, the user input unit 123 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion electrically connected to the antenna to extend a ground area. The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

The mobile terminal 100 of the wearable device type mentioned in the foregoing description can be configured such that data can be exchanged with (or linked to) a different mobile terminal (e.g., a mobile terminal of a smartphone type, etc.). The short range communication module 114 can detect or recognize a different mobile terminal located nearby, which can communicate with the mobile terminal 100. Moreover, if the detected different mobile terminal is a device authenticated to communicate with the mobile terminal 100, the controller 180 can transmit at least one portion of data processed by the mobile terminal 100 to the different mobile terminal through the short range communication module 114. Hence, a user can use the data processed by the mobile terminal 100 using the different terminal, and vice versa.

Generally, a mobile terminal having a touchscreen and an acceleration/gyro sensor (hereinafter called 'motion sensor' for clarity) can consider two kinds of command input methods. One of the command input methods is a method of using a change of a motion sensor value in accordance with a motion of a mobile terminal along a motion of a user body (i.e., a user's gesture). The other is a method of detecting a touch input through a touchscreen. Examples of the command input methods are described in detail with reference to FIG. 3 and FIG. 4 as follows.

Figure 3:
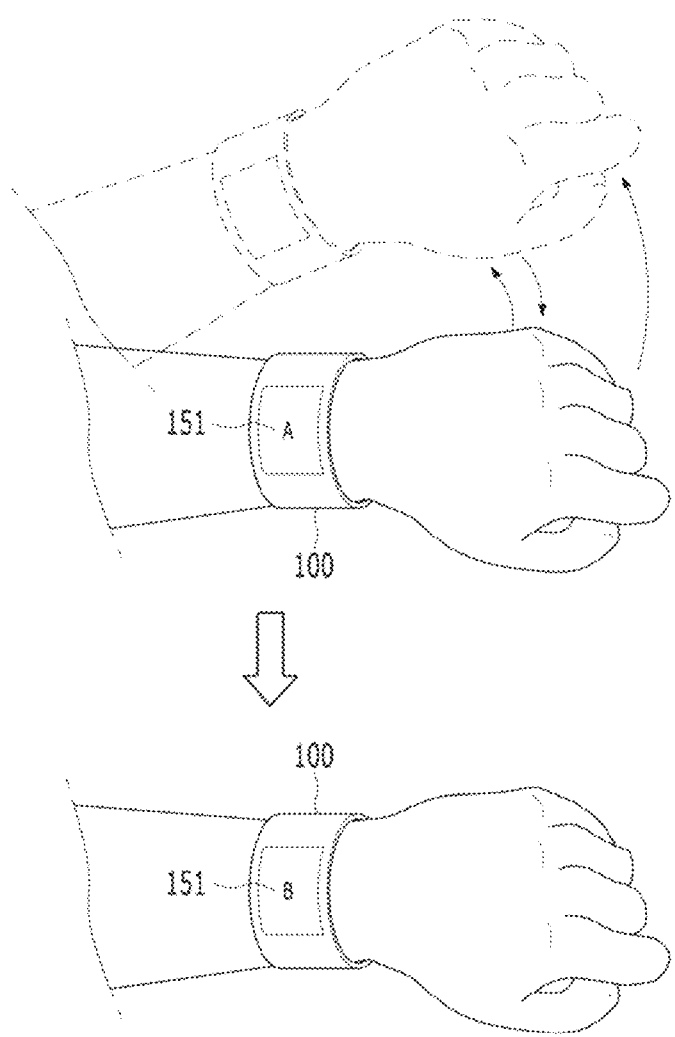
FIG. 3 is a diagram illustrating one example of a command input method through a general gesture.

FIG. 3 is a diagram illustrating one example of a command input method through a general gesture. Referring to FIG. 3, a random content is displayed on a touchscreen 151 provided to an outer circumference of a mobile terminal 100. Further, if a user waves a user's wrist once, the random content displayed on the touchscreen 151 can be changed into other content, as shown in the lower part of the drawing. Such a command input method is disclosed in U.S. Published Patent Application No. US20140160078A1.

Figure 4:
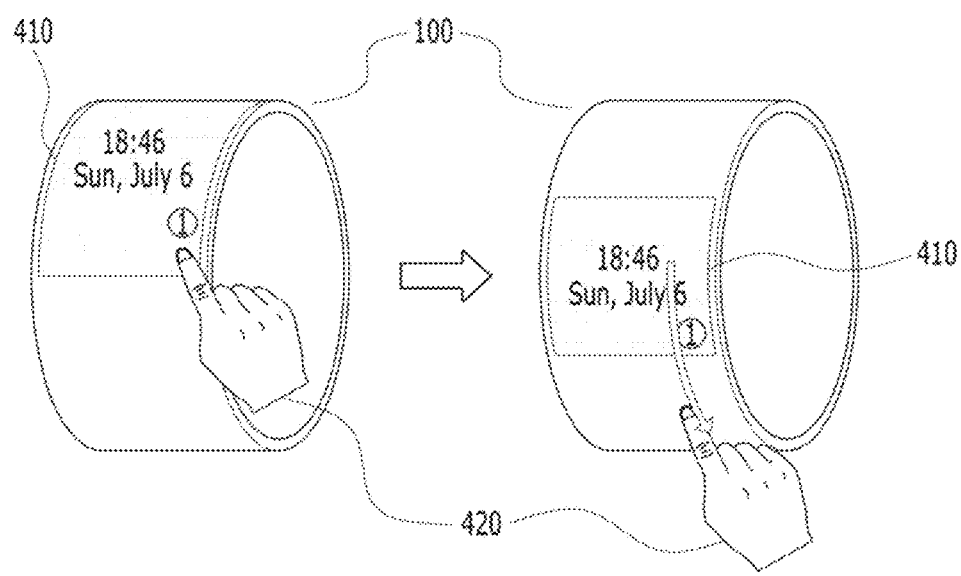
FIG. 4 is a diagram illustrating one example of a command input method through a general touch-drag in a bangle type terminal.

Next, FIG. 4 is a diagram illustrating one example of a command input method through a general touch-drag in a bangle type terminal. Referring to FIG. 4, a standby screen 410 is displayed through the touchscreen 151 on the outer circumference of the mobile terminal 100, as shown in a left part of the drawing. If the standby screen 410 is touched with a pointer 420 and then dragged in a bottom direction, the standby screen 410 can be moved to a bottom end in an outer circumference direction, as shown in a right part of the drawing.

Command Input through Simultaneously Detecting Touch Input and Motional State

By the above-described command input methods, a command for moving or scrolling a previously displayed display object and the like can be input to a mobile terminal. Yet, according to the above-described command input method, a command of one type is input at a time in general. In particular, since a touch-drag input and an input through a gesture are considered as separate inputs according to a related art, respectively, there have been limited types of command inputs only.

According to one embodiment, the present invention performs various functions (e.g., creation of a new display object/region, change a moving/display state of a display object/region, etc.) by inputting different commands of two types simultaneously. In particular, while a pointer is placed on a touchscreen of a touchscreen of a mobile terminal (i.e., the touchscreen is in contact with the pointer), if a user rotates a user's wrist, the mobile terminal is rotated together with the wrist and a contact point of the pointer naturally moves along a surface of the rotated touchscreen. Hence, as the touchscreen is rotated while the pointer remains still by maintaining the contact state, a touch-drag input is detected in viewpoint of the touchscreen.

Thus, in response to the rotation of the wrist, the touch-drag input is detected from the touchscreen and a rotational state is detected through a motion sensor as well. Further, a touch direction recognized through the touchscreen and a rotational direction of the mobile terminal naturally becomes opposite to each other. In particular, by combining the rotational direction and the direction of the touch-drag input together, the controller 180 can accurately determine whether the touch input detected from the touchscreen and the rotation of the mobile terminal detected through the motion sensor correspond to a user-intended command input.

Such a command input method is described in detail with reference to FIG. 5 and FIG. 6 as follows. In particular, FIG.

5 is a diagram illustrating one example of a process for detecting both a touch input and a motional state change in a mobile terminal according to one embodiment of the present invention.

Referring to FIG. 5(a), while a user wears a mobile terminal 100 on a left wrist, the user touches a touchscreen 151 located in a direction of a back of a left hand with a finger of a right hand 510. Further, referring to FIG. 5(b), if the left wrist is rotated without moving the right hand 510 such that a palm of the left hand faces the user, the mobile terminal 100 worn on the left wrist is rotated together with the left wrist. Namely, in viewpoint of the mobile terminal 100, referring to FIG. 5(c), a contact point on the touchscreen 151 touched with the right hand finger is changed into a point 530 relatively below an initial touch point 520. Looking into a development planar figure 100' of the mobile terminal, referring to FIG. 5(d), an effect of detecting a touch-drag input to the final touch point 530 from the initial touch point 520 is caused to the touchscreen 151. Moreover, a direction of the touch-drag input can be regarded as opposite to the detected rotational direction.

Comparing to a general touch-drag input, the above command input method differs in that a rotational motion is simultaneously detected by the motion sensor of the mobile terminal together with a touch-drag input. In this instance, since a motional state detected by the motion sensor of the mobile terminal complies with a user's intention to input a command to the mobile terminal, it is named 'rotation command'.

Meanwhile, when a touch sensor is provided along a lateral side of the mobile terminal, i.e., a space between an outer circumference and an inner circumference, the controller 180 can recognize a command different from that of a touch with a finger to the touchscreen provided to the outer circumference. This is described in detail with reference to FIG. 6 as follows.

FIG. 6 is a diagram illustrating another example of a process for detecting both a touch input and a motional state change in a mobile terminal according to one embodiment of the present invention. Referring to FIG. 6(a), while a user wears a mobile terminal 100 on a left wrist, the user touches a prescribed point on a lateral face of the mobile terminal 100 located in a direction of a back of a left hand with a finger of a right hand 510. Further, referring to FIG. 6(b), if the left wrist is rotated without moving the right hand 510 such that a palm of the left hand faces the user, the mobile terminal 100 worn on the left wrist is rotated together with the left wrist. Namely, in viewpoint of the mobile terminal 100, referring to FIG. 6(c), a contact point on the touchscreen 151 touched with the right hand finger is changed into a point 630 in a relatively counterclockwise direction from an initial touch point 620. Looking into it at a slant angle, referring to FIG. 6(d), an effect of detecting a touch-drag input to the final touch point 630 from the initial touch point 620 is caused to the touchscreen 151. Comparing to a general touch-drag input, the above command input method differs in that a rotational motion is simultaneously detected by the motion sensor of the mobile terminal together with a touch-drag input.

In the following description, when a command is input by the above-described command input method, an operation of the mobile terminal according to an embodiment of the present invention is explained in detail with reference to the accompanying drawings.

FIG. 7 is a diagram illustrating one example of an operating process in accordance with simultaneous detections of a touch and rotation in a mobile terminal according to one embodiment of the present invention. Referring to FIG. 7, controller 180 detects a touch to the touchscreen (S710). While the touch state continues to be maintained (i.e., the touch keeps being detected through the touchscreen), if a rotation is detected through the motion sensor (S720), the controller 180 can control a function, which corresponds to a touch point changed while detecting the rotation, to be executed (S730).

In particular, the controller 180 determines a distance and direction between a touch point before a start of the rotation and a touch point at a timing point of an end of the rotation and can then execute the function corresponding to the determined distance and direction. Yet, while the touch input is detected, if the rotation is not detected or an extent of the rotation fails to reach a preset threshold, the controller 180 determines the detected touch input as a simple touch input and can execute a function corresponding to the detected touch input (S740).

In the following description, functions executable to correspond to a touch point changed while detecting a rotation are explained in detail with reference to the accompanying drawings. First of all, extension, reduction and deformation of a display region are described with reference to FIGS. 8A to 14. In the following drawings, assume a situation that a basic standby screen (e.g., a watch) is displayed due to an activation of a predetermined region only despite that a display of a mobile terminal occupies at least one half of a total outer circumference area along an outer circumference.

In this instance, the activation of the predetermined region may mean that any information is not displayed on a region except an activated region or a preset color (e.g., black.) or pattern continues to be displayed. In addition, the activation of the predetermined region may mean that a backlight is partially tamed off on a region except an activated region or that a light emitting device of a region except an activated region is deactivated when a configuration of a display with OLED. Specifically, if a visual information is displayed using the present region, it consumes a power less than that consumed by a display having a whole display region activated. Hence, it is efficient in considering a limited battery capability of a mobile terminal. For clarity, in the following description, a region activated as a default is called an 'existing display region', 'default display region', or 'basic display region'.

Figure 8A:
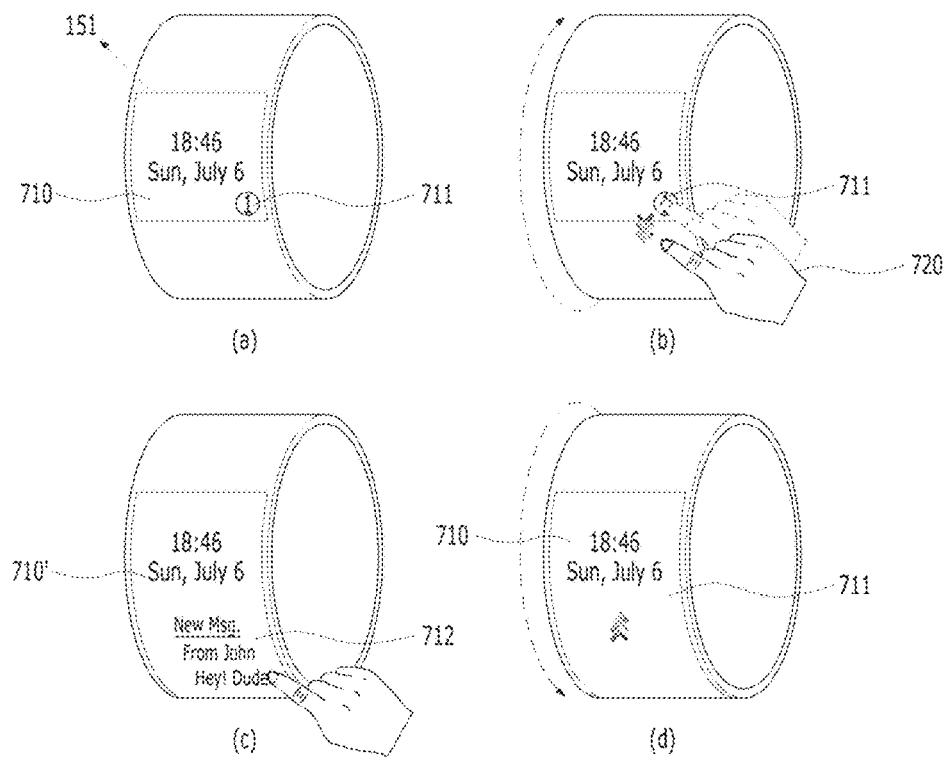
FIG. 8A and FIG. 8B are diagrams illustrating one example of a process for checking a notification information in a mobile terminal according to one embodiment of the present invention.
Figure 8B:
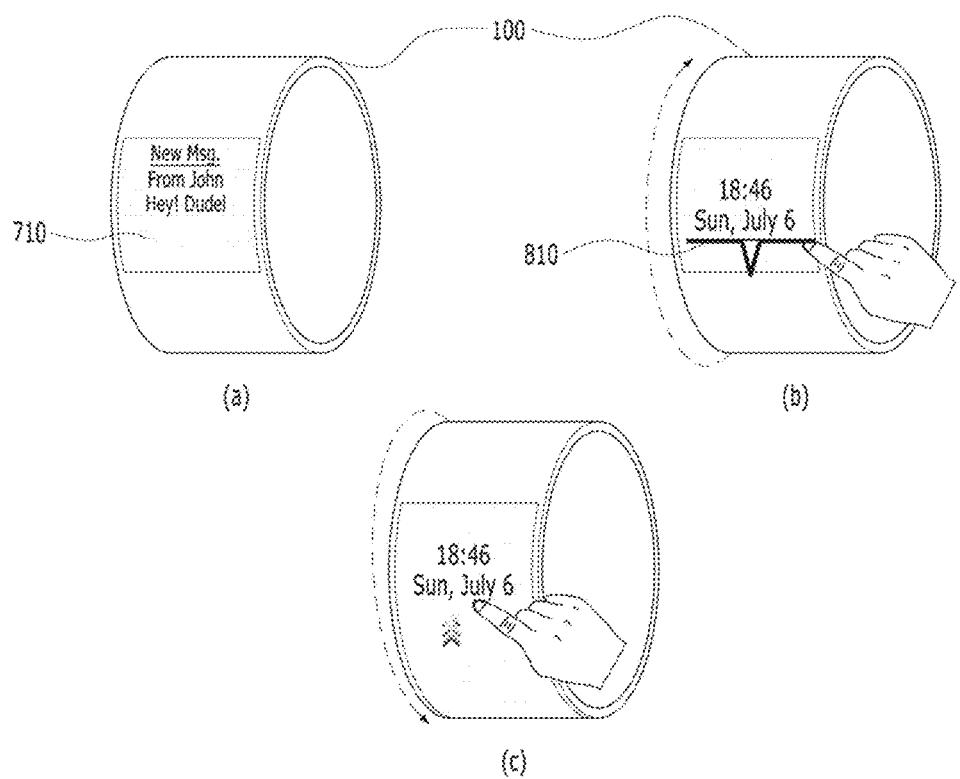

FIG. 8A and FIG. 8B are diagrams illustrating one example of a process for checking a notification information in a mobile terminal according to one embodiment of the present invention. Referring to FIG. 8A(a), as a prescribed region 710 of a touchscreen 151 is activated, a standby screen is displayed on the activated prescribed region 710. Further, if an event (e.g., a text message reception, etc.) occurs, an event indicator 711 can be displayed at a prescribed location of the corresponding region 710.

Referring to FIG. 8A(b), if a user rotates a wrist in an arrow direction while touching the event indicator 711 with a finger 720, the touch point is changed into a point below the event indicator 711 so that a touch input like dragging down the corresponding indicator 711 can be eventually detected from the touchscreen. Hence, referring to FIG. 8A(c), the controller 180 extends the activated region into a region 710' up to a touch point at which the writs rotation stops. The controller 180 then controls a content 712 of a received message to be displayed within the extended region.

In this instance, the displayed content 712 of the message may differ in an extent of displayed information in proportion to an extent of the rotation (i.e., a site of the extended region). For instance, if a rotation at 30 degrees is detected, a sender of the message and a first line of the content are displayed only. In another instance, if a rotation at 60 degrees is detected, the rest of the message content and an arrival time can be displayed in addition. In still another instance, if a rotation at 90 degrees is detected, other messages previously exchanged with the sender of the corresponding message can be displayed in a thread format.

Thus, through a touch-drag and a rotational action input simultaneously, detailed information of an event notification and a display region can be extended at a time. Moreover, a direction of extending a display region is equal to a touch-drag direction and opposite to a rotational direction. If the user rotates the wrist in a reverse direction after releasing the touch contact state (FIG. 8A(d)) or a predetermined time lapses since releasing the touch contact state, the extended display region 710' in the touchscreen can be restored into the sate shown in FIG. 8A(a).

Of course, if the event indicator 711 is selected through a simple touch input in the situation shown in FIG. 8A(a), referring to FIG. 8B(a), the detailed content of the received message can be displayed through the activated region 710. Moreover, when the event indicator 711 is touched, it may be blocked by a finger. Thus, in order to inform the user that the indicator 711 is correctly touched, referring to FIG. 8B(b), a prescribed visual effect 810 can be displayed. In particular, the visual effect 810 may include a visual effect (e.g., icon, numeral/text, indicator, etc.) indicating the number of events, types of events, event related applications and the like.

Meanwhile, in the situation shown in FIG. 8A(c), if the touch input is not released or the user rotates the wrist in a reverse direction while maintaining a contact state after a re-touch, the notification for the corresponding event or a notification for another event triggered by an application corresponding to the former event may not be further displayed.

Figure 9:
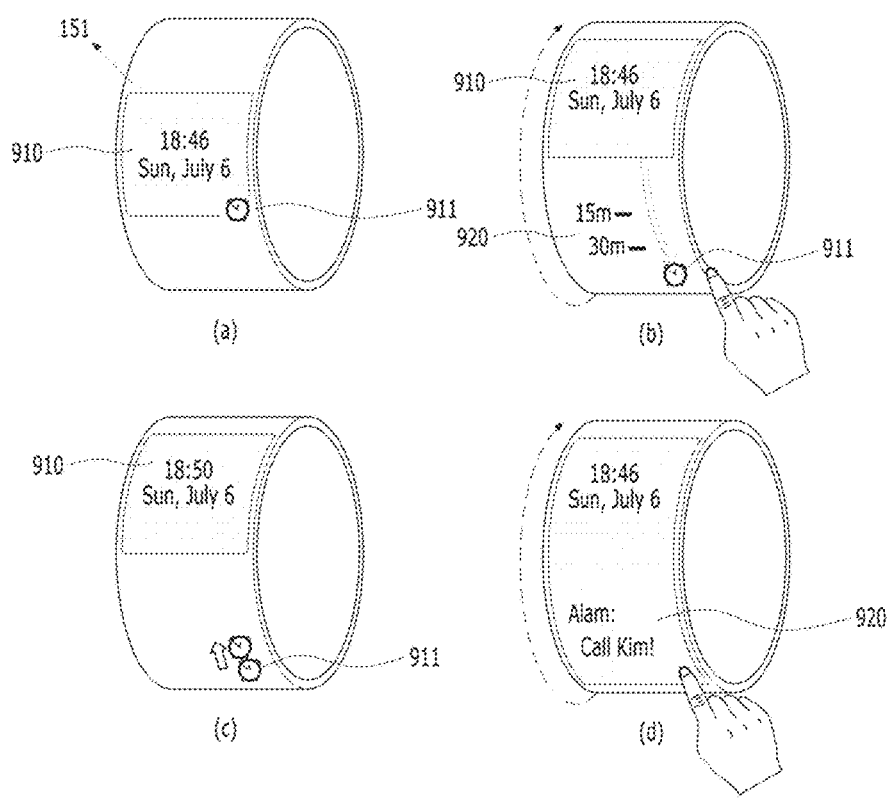
FIG. 9 is a diagram illustrating one example of a process for resetting an alarm information in a mobile terminal according to one embodiment of the present invention.

Next, an alarm resetting method is explained in detail with reference to FIG. 9. In particular, FIG. 9 is a diagram illustrating one example of a process for resetting an alarm information in a mobile terminal according to one embodiment of the present invention. Referring to FIG. 9, an alarm time is reset by moving an indicator displayed in accordance with an arrival of an alarm time by a command input method according to an embodiment of the present invention.

Referring to FIG. 9A(a), as a prescribed region 910 of a touchscreen 151 is activated, a standby screen is displayed on the activated prescribed region 910. Further, if a preset alarm time arrives, an alarm indicator 911 can be displayed at a prescribed location of the corresponding region 910. Further, if a user attempts to reset an alarm time, referring to FIG. 9(b), the user can rotate their wrist in an arrow direction while touching a lateral face of the mobile terminal with a finger.

Hence, the alarm indicator 911 can be moved down as a display region is extended in a bottom direction in response to an extent of the rotation (i.e., a distance of a touch-drag input applied to the lateral face). Thus, in the user's eyes, the standby screen displayed region 910 seems to move upward in response to the rotation of the mobile terminal. In addition, time gradations can be displayed on the display region 920 extended in the bottom direction. If the user moves the alarm indicator down by rotating the wrist to the extent of a time desired for the alarm resetting with reference to the time gradations and then releases the touch, the controller 180 can reset the alarm information to turn on an alarm after a lapse of a time corresponding to a location at which the alarm indicator is located on releasing the touch.

With a lapse of a time, referring to FIG. 9(c), the alarm indicator 911 can move to get closer to the standby screen displayed region 910 gradually. If the alarm indicator 911 arrives at the location shown in FIG. 9(a), the controller 180 can inform the user that the alarm time arrives through a preset output. By such a method, the user can conveniently check a time remaining until the alarm setting time and can also conveniently extend/change an alarm time.

In addition, when the wrist is rotated while the alarm indicator 911 on the touchscreen, as shown in FIG. 9(d), is touched with a finger instead of the lateral face, as mentioned in the foregoing description with reference to FIG. 8A, an activated display region is extended in the bottom direction in response to the rotation distance and a detailed information of the alarm can be displayed on the extended region 920. Moreover, while the touchscreen (or alarm indicator) is touched with at least two fingers instead of the lateral face, an input of rotating the wrist may apply thereto.

Meanwhile, as mentioned in the foregoing description, the extended display region disappears after a lapse of a predetermined time by being left intact after releasing the touch. Alternatively, the extended display region disappears if the wrist is rotated in a. reverse direction by maintaining the touch. if a prescribed setting is established, the display region can be maintained in the extended state despite being left intact over a predetermined time after releasing the touch. Otherwise, a method of maintaining the extended state is required. This is described in detail with reference to FIG. 10 as follows.

Figure 10:
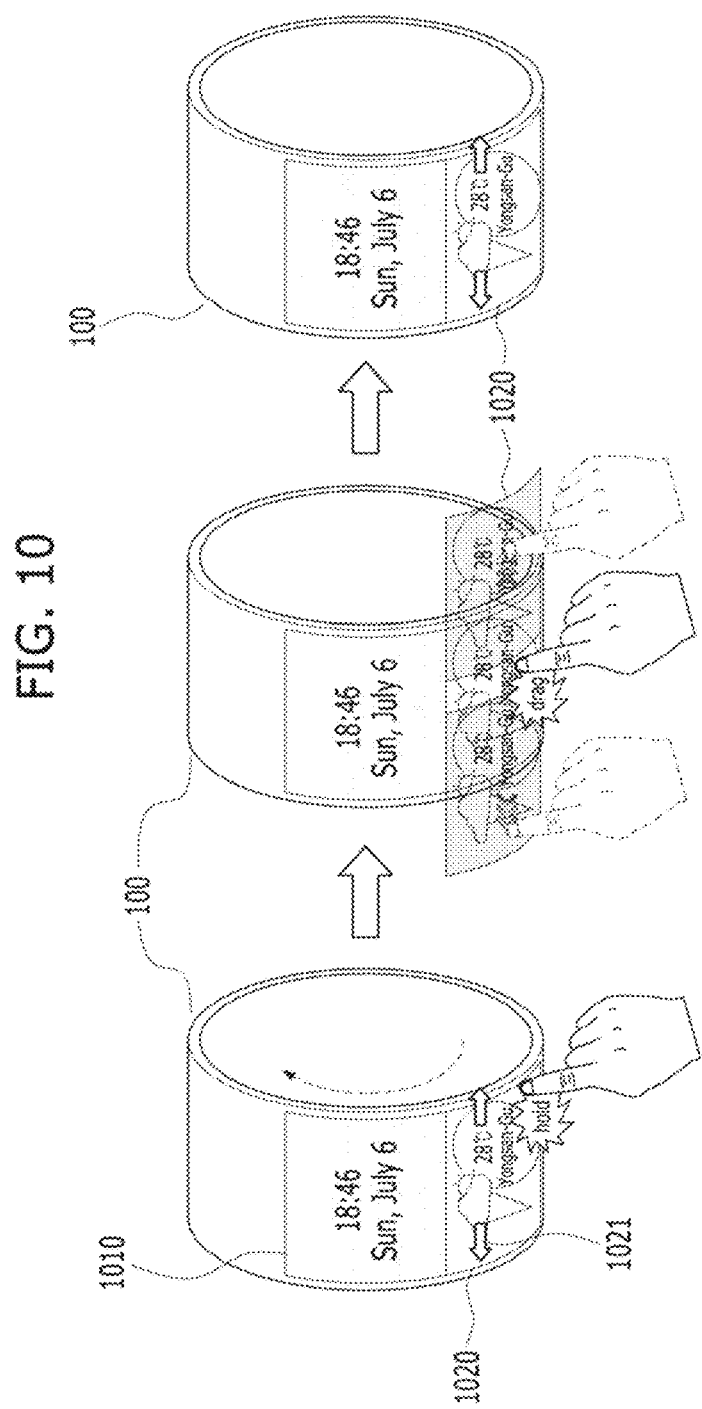
FIG. 10 is a diagram illustrating one example of a method of fixing an extended display region in a mobile terminal according to one embodiment of the present invention.

FIG. 10 is a diagram illustrating one example of a method of fixing an extended display region in a mobile terminal according to one embodiment of the present invention. Referring to a left part of FIG. 10, as both a touch and a rotation are simultaneously detected, the controller 180 can control an extended display region 1020 to be displayed under an existing display region 1010. Further, if an extent of the rotation (and a corresponding touch-drag distance) exceeds a preset threshold, it can display an indicator 1021 indicating that the extended display region 1020 can be fixed thereto through a width-directional drag input.

When the indicator 1021 is displayed, if a user drags a finger, which is the touch input is maintained, in a left or right direction, as shown in a middle part of FIG. 10, the extended display region 1020 can continue to be displayed by being fixed thereto without disappearing despite releasing the touch input, as shown in a right part of FIG. 10.

Meanwhile, if the extended display region 1020 is fixed, an indicator indicating the fixed state may be displayed. In this instance, the indicator indicating the fixed state may be displayed on a prescribed edge of the fixed extended display region 1020 or at a preset location. The indicator may be displayed on an edge at which the width-directional drag input for the fixation is ended. If this indicator is dragged in a center direction again, the extended display region can be released from the fixed state. Further, if the mobile terminal is waved in the fixed state of the extended display region or the wrist is rotated in a direction reverse to that of the rotation for creating the extended display region in the course of maintaining the touch to the extended display region, it can release the extended display region from the fixed state.

An extended display region of each of the above-described embodiments is implemented by being extended from an existing display region (or an activated display region). Yet, if an extent of a rotation exceeds a preset threshold, the extended display region can become a separate display region separated from the existing display region. This is described in detail with reference to FIG. 11 as follows.

Figure 11:
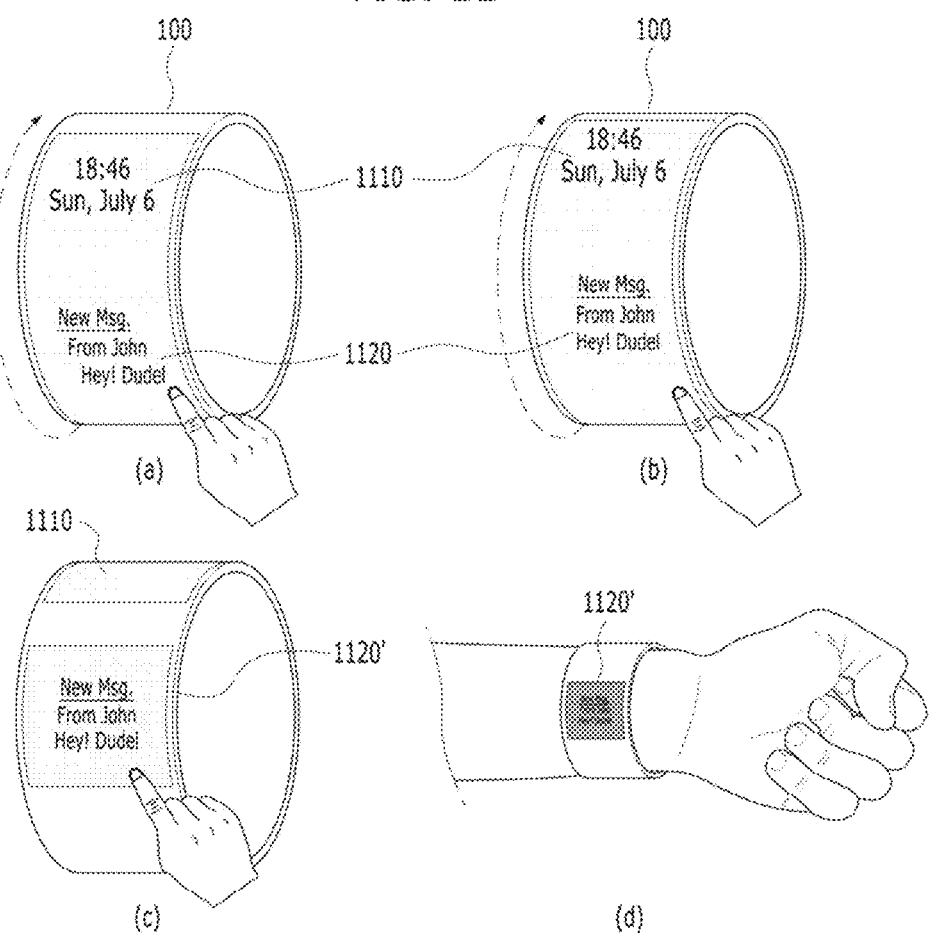
FIG. 11 is a diagram illustrating one example of a method of separating an extended display region in a mobile terminal according to one embodiment of the present invention.

FIG. 11 is a diagram illustrating one example of a method of separating an extended display region in a mobile terminal according to one embodiment of the present invention. Assume that FIG. 11 shows a process that follows the process shown in FIG. 8A(c). Referring to FIG. 11(a), while a touch to a touchscreen is maintained, as the wrist is rotated, an extended display region 1120 is gradually extended from an existing display region 1110. Further, as the wrist is further rotated, if a drag over a predetermined distance is detected from the touchscreen or a rotation over a predetermined angle is detected by a motion sensor (FIG. 11(b)), the extended display region 1120' can become a separate display region by being separated from the existing display region 1110.

If a rotation in a direction reverse to that of the creation of the corresponding region is detected while the touch input is maintained, or if waved motions over a predetermined count are simply detected, the separated extended display region 1120' can disappear. If an event of which at least one portion has the same attribute of an initially displayed event related information is triggered later, contents of the newly triggered event can keep being displayed on the separated extended display region 1120'. For instance, if a received message is displayed on the separated extended display region 1120', a text message received later from a counterpart of the corresponding text message can be continuously displayed on the extended display region. This function is advantageous for privacy protection when the separate extended display region 1120' is located on a palm side shown in FIG. 11(d).

Figure 12:
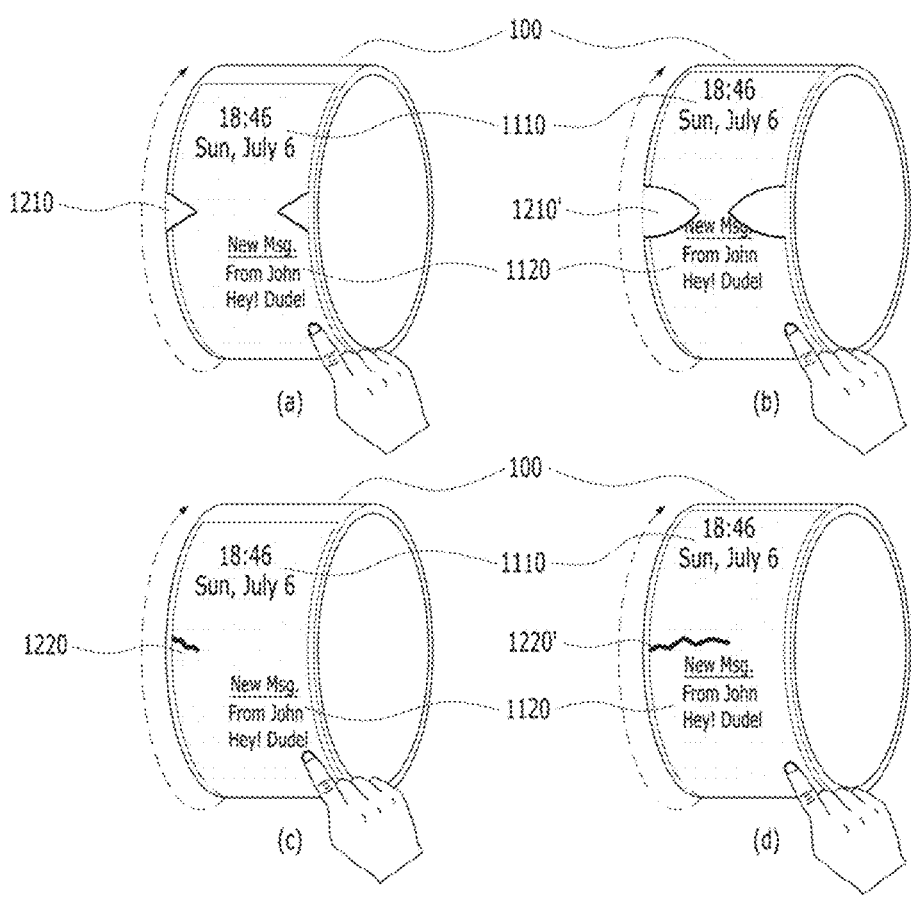
FIG. 12 is a diagram illustrating one example of a method of visually displaying an extent of a rotation required for separation of an extended display in a mobile terminal according to one embodiment of the present invention.

Further, how much the user should rotate the wrist until the extended display region is separated can be selected. This is described in detail with reference to FIG. 12 as follows. FIG. 12 is a diagram illustrating one example of a method of visually displaying an extent of a rotation required for separation of an extended display in a mobile terminal according to one embodiment of the present invention.

Referring to FIG. 12(a), while a touch is maintained, as a rotation is detected, an extended display region 1120 is displayed by being extended from an existing display region 1110. Further, as the rotation proceeds, a visual effect 1210 is displayed as if a region becoming a boundary between two display regions is extended like an elastic body in a manner that both ends of the boundary are recessed. If the rotation further proceeds, referring to FIG. 12(b), the visual effect 1210' is displayed in a manner that the recessed ends of the boundary are further recessed. If the rotation proceeds further again, the two regions can be separated from each other with an effect of cutting the boundary between the two regions.

Alternatively, referring to FIG. 12(c), a visual effect 1220 is displayed as if a paper is torn from one side end portion of the boundary region between the two regions in a direction of the other side. As the rotation proceeds, referring to FIG. 12(d), the tearing visual effect 1220' can be elongated. Thereafter, as the rotation further proceeds, if the visual effect of tearing the paper reaches the other side end portion, the two regions can be separated from each other.

Besides the above-mentioned visual effects, when a rotation/drag enough to separate the two regions from each other is performed, a sound or vibration corresponding to the performed rotation/drag can be output. In addition, the sound or vibration can gradually indicate that the separation approaches until separating the two regions from each other (e.g., by increasing a vibration cycle, by increasing a sound, etc.).

Figure 13:
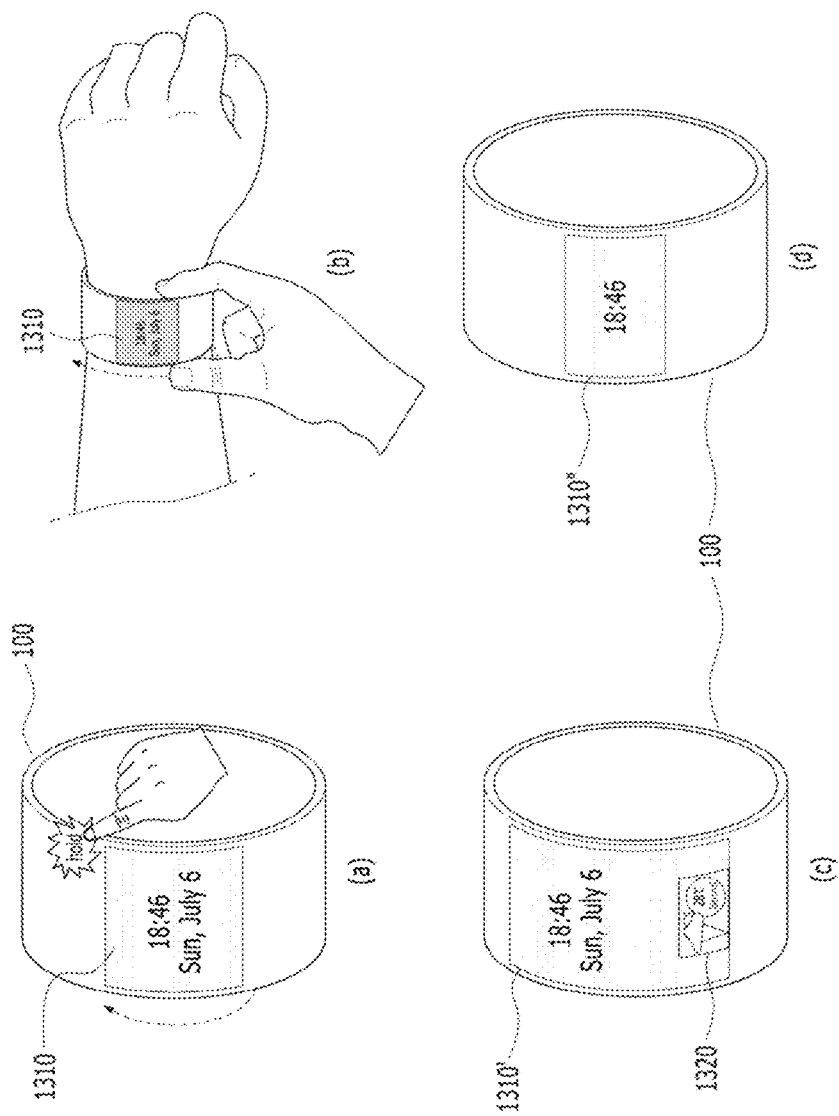
FIG. 13 is a diagram illustrating one example of a method of changing a size of a basic display region in a mobile terminal according to one embodiment of the present invention.

According to one embodiment of the present invention, a size of a basic display region is adjustable. This is described in detail with reference to FIG. 13 as follows. FIG. 13 is a diagram illustrating one example of a method of changing a size of a basic display region in a mobile terminal according to one embodiment of the present invention.

Referring to FIG. 13, when a standby screen or a running screen of a random application is displayed on a basic display region 1310, if a user rotates a wrist by maintaining a touch to a lateral face of a mobile terminal (FIG. 13(a)) or by continuing to touch both lateral faces of the mobile terminal simultaneously (FIG. 13(b)), the basic display region can be extended into an extended display region 1310' (FIG. 13(c)). Hence, a new information 1320 can be further displayed on the extended region. Moreover, if a rotation is applied in a direction opposite to that shown in FIG. 13(a) or FIG. 13(b), the basic display region can be reduced into a reduced region 1310". If the rotation is further performed over a predetermined extent in the reduced direction, the basic display region may disappear totally.

Meanwhile, when a basic display region is extended, an existing information may be displayed in further detail in response to an extent of the extension (e.g., when a weather information is displayed, if a basic display region increases in size, a weekly weather forecast or an hourly weather forecast can be additionally displayed), an information of a new category (e.g., a widget, an icon, an indicator, etc.) different from that of the existing information may be displayed (FIG. 13(c)), or a combination of the two information displays may be possible. On the contrary, when a basic display region is reduced, types or forms of previously displayed information may be reduced or changed. For instance, when a circular analog watch is displayed, if a display region is reduced, a digital watch represented as numerals only may be displayed. In another instance, when a date and hour are displayed together, if a display region is reduced, the hour may be displayed only.

Figure 14:
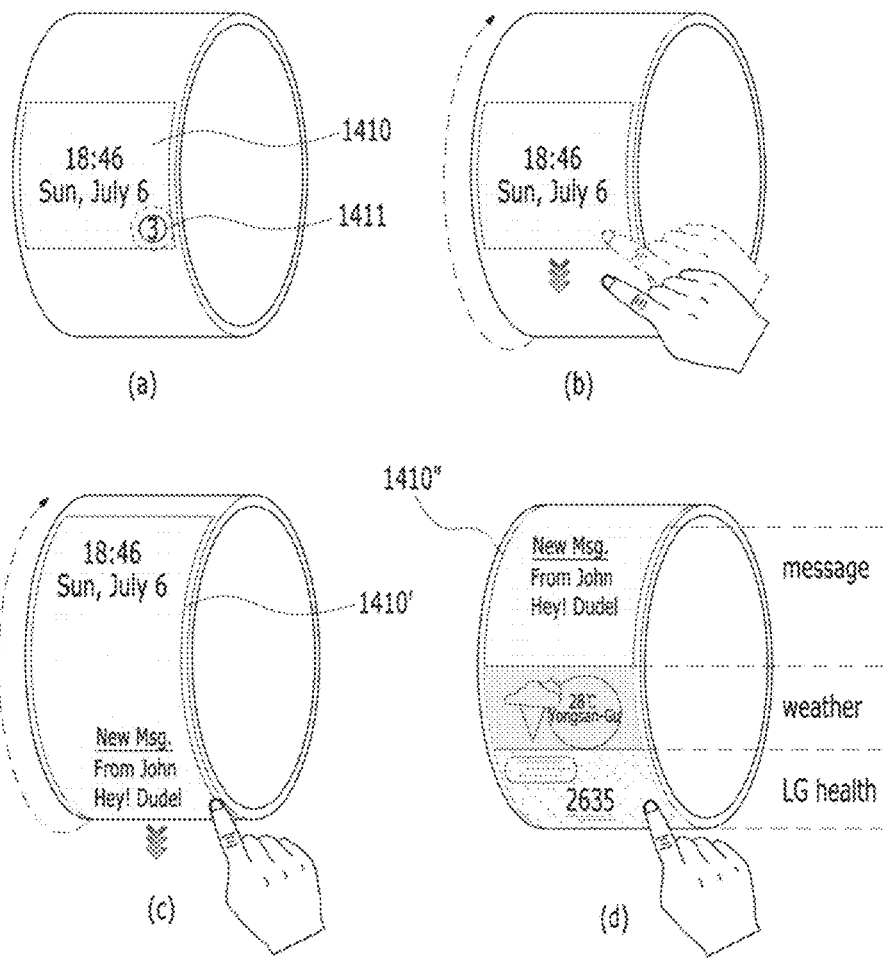
FIG. 14 is a diagram illustrating one example of a method of checking each event related information simultaneously when triggering a plurality of events in a mobile terminal according to one embodiment of the present invention.

In the following description, a case of triggering a plurality of events is explained in detail with reference to FIG. 14. FIG. 14 is a diagram illustrating one example of a method of checking each event related information simultaneously when triggering a plurality of events in a mobile terminal according to one embodiment of the present invention.

Referring to FIG. 14, as three kinds of different events are triggered, an event indicator 1411 displayed on a basic display region 1410 indicates a numeral '3' to correspond to the number of the events (FIG. 14(a)). Further, if a user rotates a wrist by continuing to touch the event indicator 1411 (FIG. 14(b)), the basic display region is extended into an extended region 1410' so that a detailed content of the first event (e.g., a received message) can start to be displayed from a bottom end (FIG. 14(c)). Thereafter, as the rotation proceeds, the second event (e.g., a received weather information) and the third event (e.g., an updated health information) can be sequentially displayed on an extended display region 1410". Further, the order in displaying the information on the events may follow an event triggered order or a priority preset per event.

Figure 15:
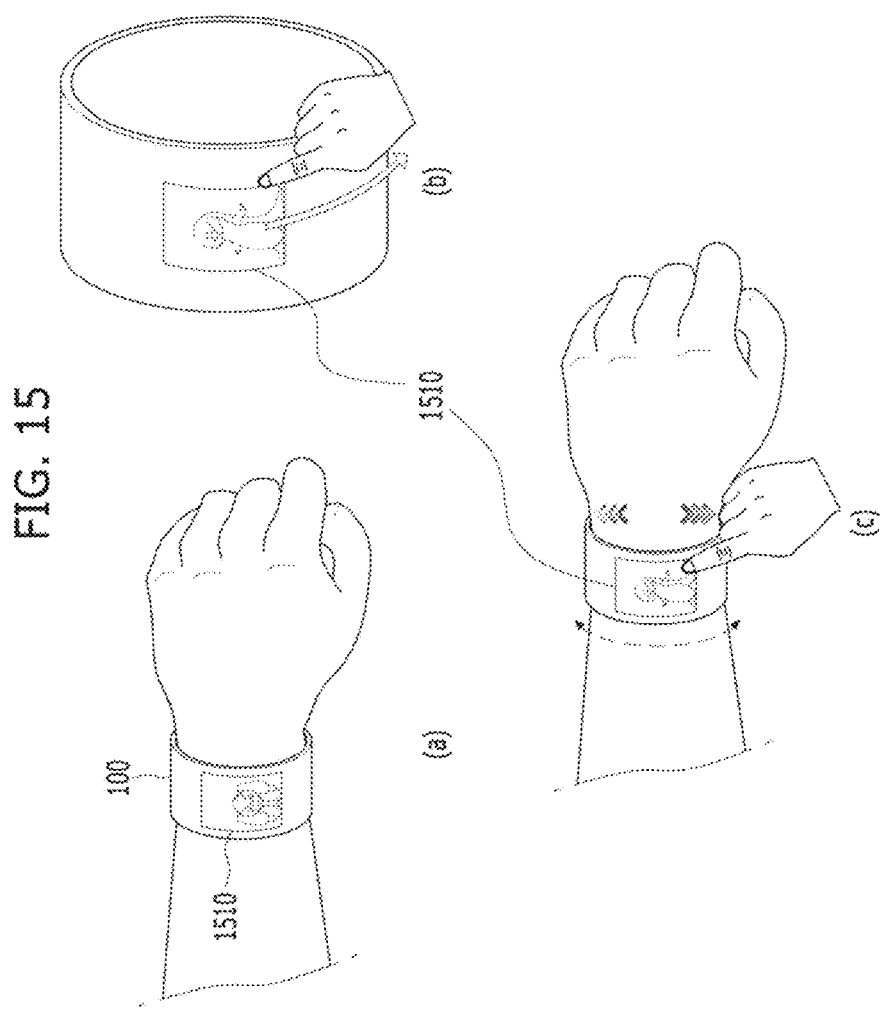
FIG. 15 is a diagram illustrating one example of a process for performing a scroll in a mobile terminal according to one embodiment of the present invention.

In the following description, a method of scrolling a display object according to an embodiment of the present invention is explained in detail with reference to FIGS. 15 to 17. FIG. 15 is a diagram illustrating one example of a process for performing scroll in a mobile terminal according to one embodiment of the present invention.

Referring to FIG. 15(a), as a gallery application is run, an image is displayed on a basic display region of a mobile terminal 100. Further, referring to FIG. 15(b), if a flicking touch input in a proscribed direction is detected from the basic display region 1510, the controller 180 can control a different image to be scrolled and displayed. While the touch input to the basic display region is detected, referring to FIG. 15(c), if a rotation is detected through a motion sensor, images can be scrolled in response to a rotational direction (or a direction reverse to the rotational direction) and a rotation extent. For instance, while a user maintains a touch, if the user maintains a state of rotating a wrist at about 20 degrees, 3 images can be scrolled per second.

In another instance, while a user maintains a touch, if the user maintains a. state of rotating a wrist at about 40 degrees, 6 images can be scrolled per second. By this command input method, a user can search for a desired image by adjusting a scroll speed. According to the example shown in FIG. 15, the description is made centering on an image scroll. Yet, if a scroll is available, the present example is applicable to any display items (e.g., a text message, an address book, a file list, a call log list, etc.).

FIG. 16 is a diagram illustrating another example of a process for performing a scroll in a mobile terminal according to one embodiment of the present invention. In FIG. 16, assume that a touch sensor is provided along a lateral face of a mobile terminal. In the situation shown in FIG. 15(a), referring to FIG. 16(a), if a user rotates a wrist by continuing to touch both lateral faces of a mobile terminal 100, as the rotation proceeds, a currently displayed image 1611 and following images 1612 and 1613 can be displayed by being stacked on each other. In this instance, the images may include images belonging to the same category (e.g., images attached to messages exchanged with the same counterpart, images created in the same application, images saved in the same storage space/location, etc.) or mutually associated images (e.g., images having the same tag information as a location, a character, a time, etc.).

While the touch input is maintained, if a rotational input is detected, referring to FIG. 16(b), the stacked images are spread in a length direction gradually so as to be displayed by being mutually connected to each other (or being mutually spaced apart from each other in a predetermined distance). While the images are spread, a unit of images scrolled through a general flicking input (e.g., a touch-drag input relatively short within a prescribed distance, etc.) can be changed. For instance, if the images are spread to have a first interval in-between, 3 images can be scrolled by a single flicking. In another instance, if the images are spread to have a second interval shorter than the first interval in-between, 5 images can be scrolled at a time by a single flicking.

When the image is displayed by being spread, if a rotational input in a reverse direction is detected in the course of maintaining a touch input, as the rotation of the spread images proceeds, the controller can control the images to be displayed again by being stacked on each other. Thus, a method of spreading to sequentially display a plurality of display objects stacked on each other is applicable to an event indicator. For instance, when an event indicator 1411 indicating that 3 events are triggered is displayed, if a user rotates a wrist by continuing to touch both lateral faces of a mobile terminal 100 (FIG. 16(c)), event information 1621 to 1623 stacked on each other can be displayed by being spread in a length direction (FIG. 16(d)). If the wrist is further rotated over a predetermined ext4ent, the event information can be displayed in a configuration similar to that shown in FIG. 14(d) by being arranged in the length direction without overlapping each other.

FIG. 17 is a diagram illustrating further example of a process for performing a scroll in a mobile terminal according to one embodiment of the present invention. In FIG. 17, assume that a touch sensor is provided along a lateral face of a mobile terminal. Referring to FIG. 17(a), a plurality of message items are displayed by scrollable up and down along an outer circumference of a mobile terminal 100. Further, referring to FIG. 17(b), if a user inputs a touch-drag command along a lateral face of the mobile terminal 100, the message items can be scrolled to correspond to an input direction of the command. When the user intends to check a detailed content of the message 6 item, if a touch input to a lateral side of a region 1710 for displaying the corresponding item is maintained over a predetermined time (FIG. 17(c)) or a rotational input is detected while maintaining the touch to the lateral side, the corresponding region is extended into an extended region 1720 so that the detailed information of the message 6 can be displayed (FIG. 17(d)), Further, an information of a message is partially displayed and then the whole information can he gradually displayed, in response to a size of the region 1720 extended by a rotation. Moreover, as a region for displaying a corresponding message is separated and then moves to an inside of a wrist, as shown in FIG. 11, in response to an extent of the rotation, it can be displayed by being fixed as a region separated from the rest of a message list.

Figure 18:
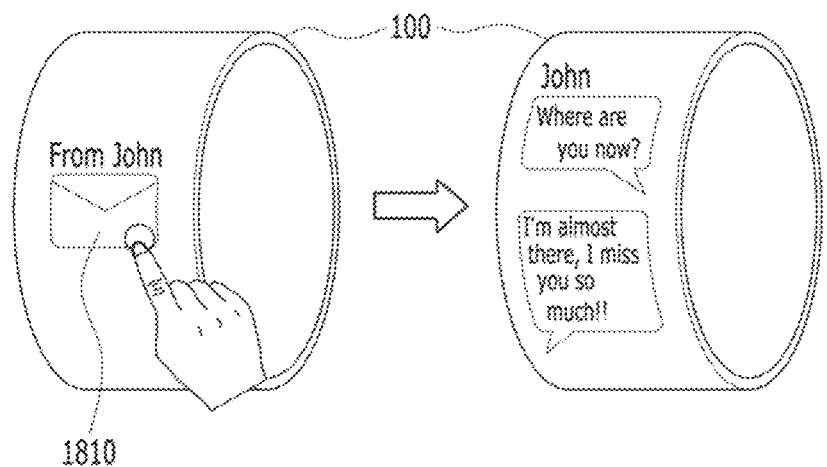
FIG. 18 is a diagram illustrating one example of a method of checking a message in a mobile terminal according to one embodiment of the present invention.

In the following description, methods of providing a privacy protective function in a mobile terminal according to one embodiment of the present invention are explained in detail with reference to FIGS. 18 to 23. FIG. 18 is a diagram illustrating one example of a method of checking a message in a mobile terminal according to one embodiment of the present invention.

Referring to a lei part of FIG. 18, as a text message is received, a text message icon 1810 can be displayed on a touchscreen. Further, if a user selects the corresponding icon 1810, referring to a right part of FIG. 18, details of the received message can be displayed. Yet, if details of a text message are checked by this method, the details of the text message can be easily disclosed to other persons nearby.

Therefore, according to the present embodiment, while a touch is maintained, if a rotation is detected, at least one region is displayed dark in part or that a prescribed region is displayed bright. This is described in detail with reference to FIG. 19 as follows. In particular, FIG. 19 is a diagram illustrating one example of a process for providing a privacy protective function in a mobile terminal according to one embodiment of the present invention.

Referring to FIG. 19(a), as a text message is received, a text message icon 1910 can be displayed on a touchscreen. Further, if a user rotates a wrist by maintaining a touch input to the touchscreen (or the text message icon 1910), referring to FIG. 19(b), information 1921 and 1923 indicating a darkness level in accordance with an extent of the rotation can be displayed. According to the example shown in FIG. 19(b), the information indicating the darkness level is illustrated as a text for example. Alternatively, a brightness changeable in response to an extent of the rotation can be illustrated by applying per distance in advance.

If the user rotates the wrist to correspond to a desired darkness and then releases the touch, referring to FIG. 19(c), the whole touchscreen is displayed dark and details of the text message can be displayed. Further, if the user touches a prescribed point of the touchscreen, referring to FIG. 19(d), a region 1930 around the corresponding touched point is displayed bright so that the user can easily check the message displayed on the corresponding region. In particular, the region displayed bright can be moved along the touched point.

Figure 20A:
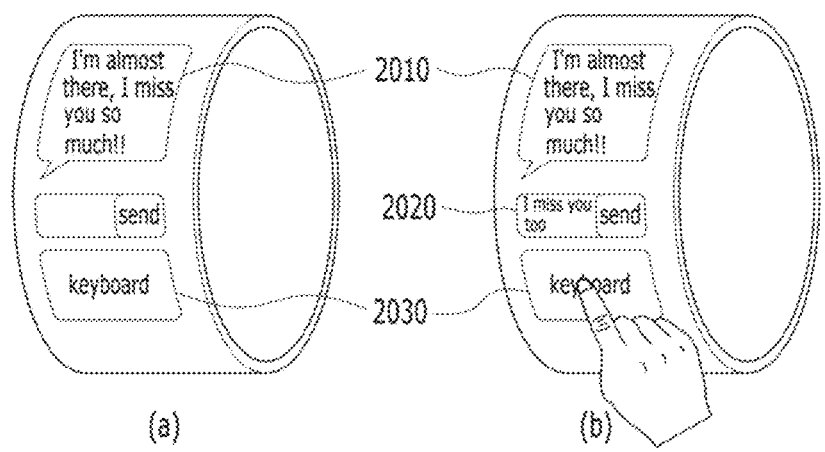
FIG. 20A and FIG. 20B are diagrams illustrating one example of a process for providing a privacy protective function in the course of composing a text message in a mobile terminal according to one embodiment of the present invention.
Figure 20B:
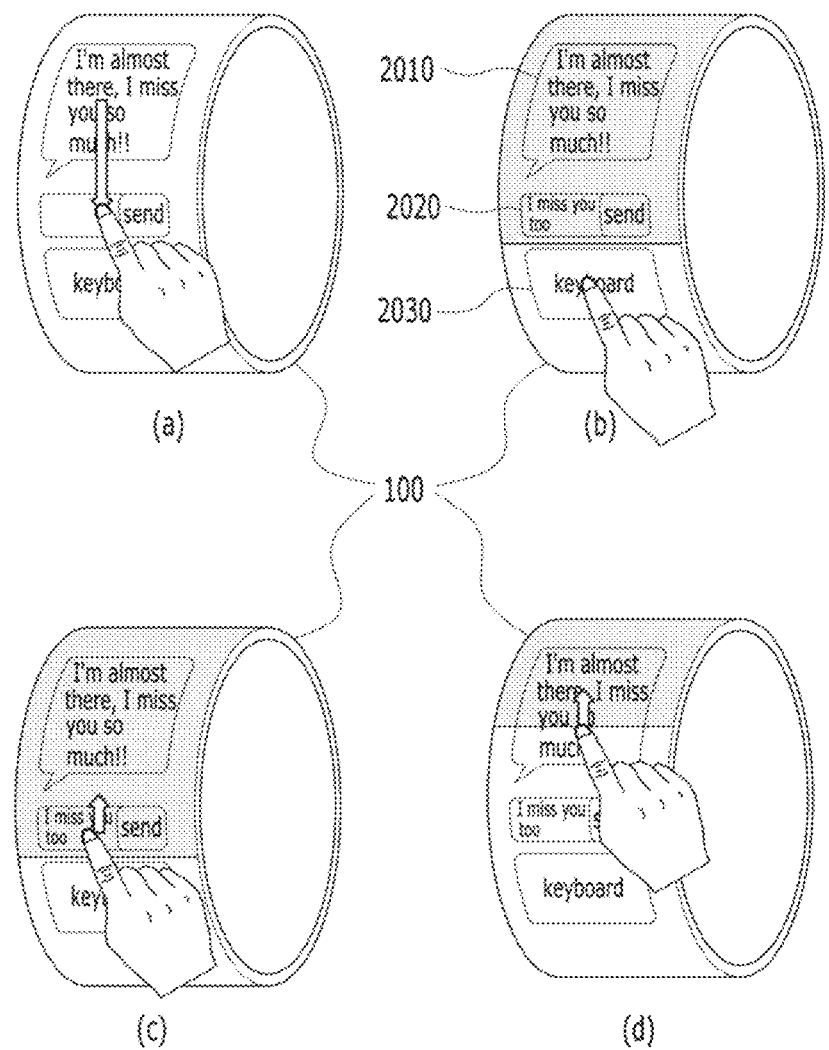

FIG. 20A and FIG. 20B are diagrams illustrating one example of a process for providing a privacy protective function in the course of composing a text message in a mobile terminal according to one embodiment of the present invention. Referring to FIG. 20A(a), if a text message application is run in a mobile terminal, an exchanged message content 2010, a message input window 2020 and a virtual keypad 2030 can be displayed on a top end, a middle end and a bottom end, respectively. If a message is composed through the virtual keypad 2030, referring to FIG. 20A(b), the composed message is displayed on the message input window 2020. If a button 'send' provided to a right side of the message input window 2020 is selected, the composed message can be sent to a counterpart.

Further, referring to FIG. 20B, when a user intends to prevent the message content 2010 and the composed message in the message input window 2020 from being exposed nearby, if the user rotates a wrist by maintaining a touch to a touchscreen (FIG. 20B(a)), a region for displaying the message content 2010 and the message input window 2020 can be displayed dark (FIG. 20B(b)). Further, optionally, a darkness level can be selected in a manner similar to that shown in FIG. 19(b).

When the user intends to reduce the dark displayed region, if the user inputs a touch-drag input in a top direction from a boundary point between a dark region and a bright region (FIG. 20B(c)), the dark displayed region can be reduced (FIG. 20B(d)). Moreover, if the touch-drag command is input over a predetermined range, the dark displayed region may disappear. If the user waves the wrist over a predetermined count, the dark displayed region can disappear at a time.

According to the embodiment mentioned in the foregoing description, the text message application is assumed as run for example, by which the present embodiment is non-limited. In addition, the privacy protective function of the present embodiment is applicable to any applications.

Figure 21:
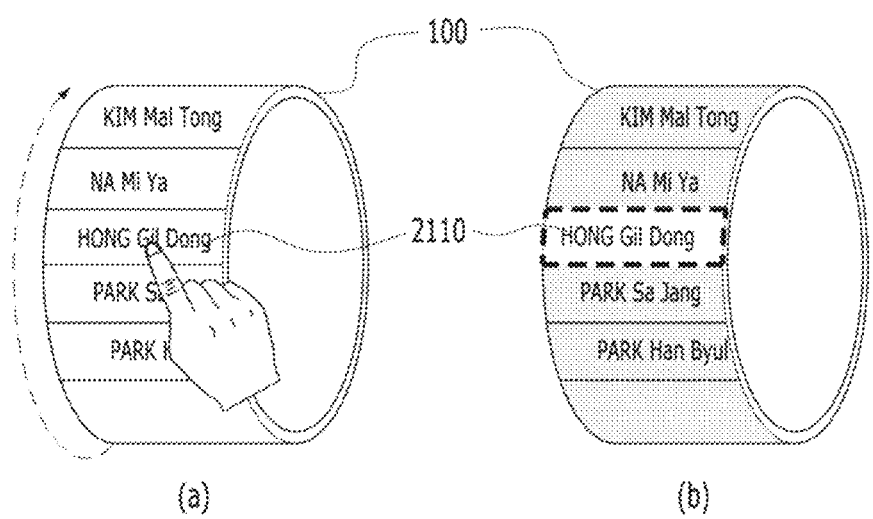
FIG. 21 is a diagram illustrating one example of a method of paging a privacy protective function in the course of displaying a scrollable list in a mobile terminal according to one embodiment of the present invention.

In the following description, a process for providing a privacy protective function in the course of displaying a scrollable list is explained in detail with reference to FIGS. 21 to 23. FIG. 21 is a diagram illustrating one example of a method of paging a privacy protective function in the course of displaying a scrollable list in a mobile terminal according to one embodiment of the present invention.

Referring to FIG. 21(a), as an address book application is run, contact items are displayed on a touchscreen of a mobile terminal 100 by being arranged along an outer circumference. Further, if a user rotates a wrist by maintaining a touch input, referring to FIG. 21(b), the rest of regions except a region 2110 for displaying a first touched item can be displayed dark.

Figure 22:
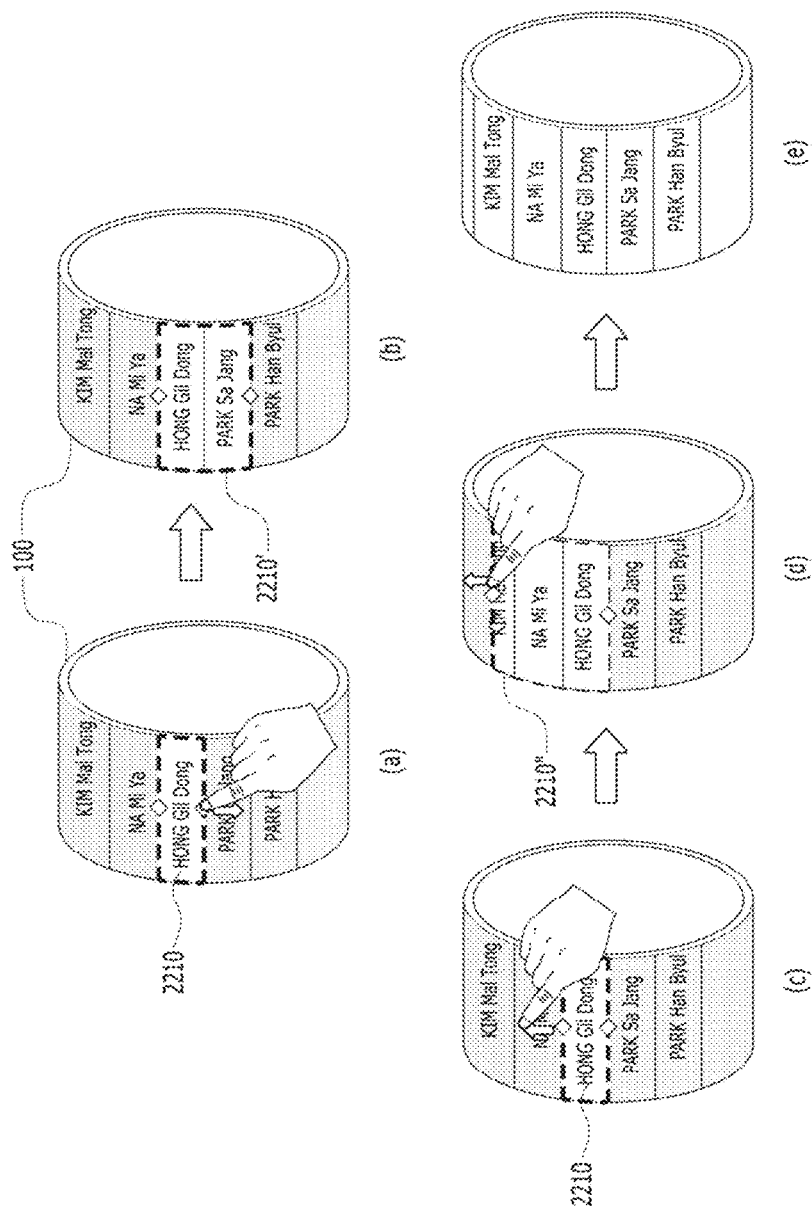
FIG. 22 is a diagram illustrating one example of a method of adjusting a size of a brightly displayed region when paging a privacy protective function in a mobile terminal according to one embodiment of the present invention.

FIG. 22 is a diagram illustrating one example of a method of adjusting a size of a brightly displayed region when paging a privacy protective function in a mobile terminal according to one embodiment of the present invention. Referring to FIG. 22(a), a user can apply a drag input in a bottom direction by continuing to touch a bottom edge of a bright displayed region 2210. Hence, referring to FIG. 22(b), a bright region can be extended into an extended region 2210' in the bottom direction. On the contrary, if a user applies a drag input in a top direction by continuing to touch a top edge of a bright displayed region 2210 (FIG. 22(c)), a bright region can be extended into an extended region 2210" in the top direction (FIG. 22(d)). Further, if the touch-drag command input in the top direction is applied over a preset range, referring to FIG. 22(e), a dark visual effect may disappear.

Figure 23:
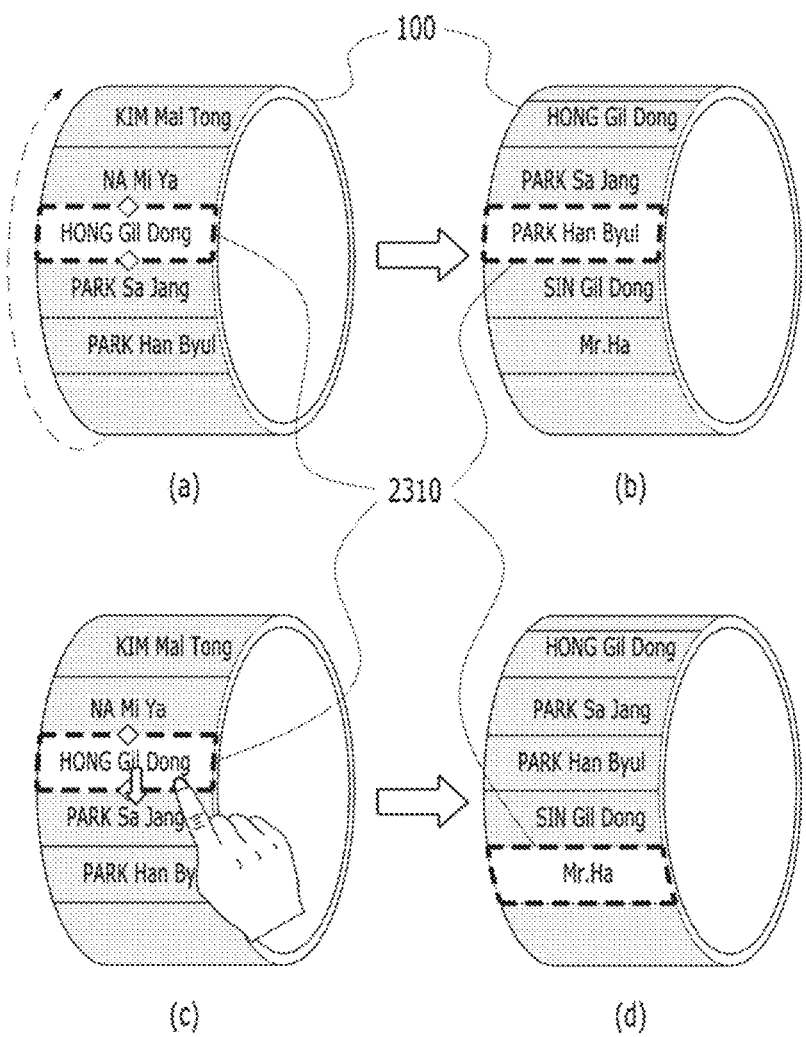
FIG. 23 is a diagram illustrating one example of a method of scrolling items of a list when paging a privacy protective function in a mobile terminal according to one embodiment of the present invention.

FIG. 23 is a diagram illustrating one example of a method of scrolling items of a list when paging a privacy protective function in a mobile terminal according to one embodiment of the present invention. Referring to FIG. 23, as a privacy protective function is activated, when a region 2310 corresponding to a single item is displayed bright, if a user rotates a wrist (FIG. 23(a)), the bright displayed region 2310 maintains its location and items in a list can be scrolled only. Further, if the user drags a bright displayed region 2310 (FIG. 23(e)), the bright displayed region 2310 can be moved in a drag direction while the items are scrolled (FIG. 23(d)). In particular, when the item is rotated together with the wrist (FIG. 23(b)), the bright displayed region 230 looks as if fixed thereto in user's view point. Yet, if the bright displayed region 2310 itself is dragged (FIG. 23(d)), the list is dragged (FIG. 23(b)). Therefore, in user's view point, the bright displayed region 2310 may look as if moving in the direction corresponding to the drag.

Figure 24:
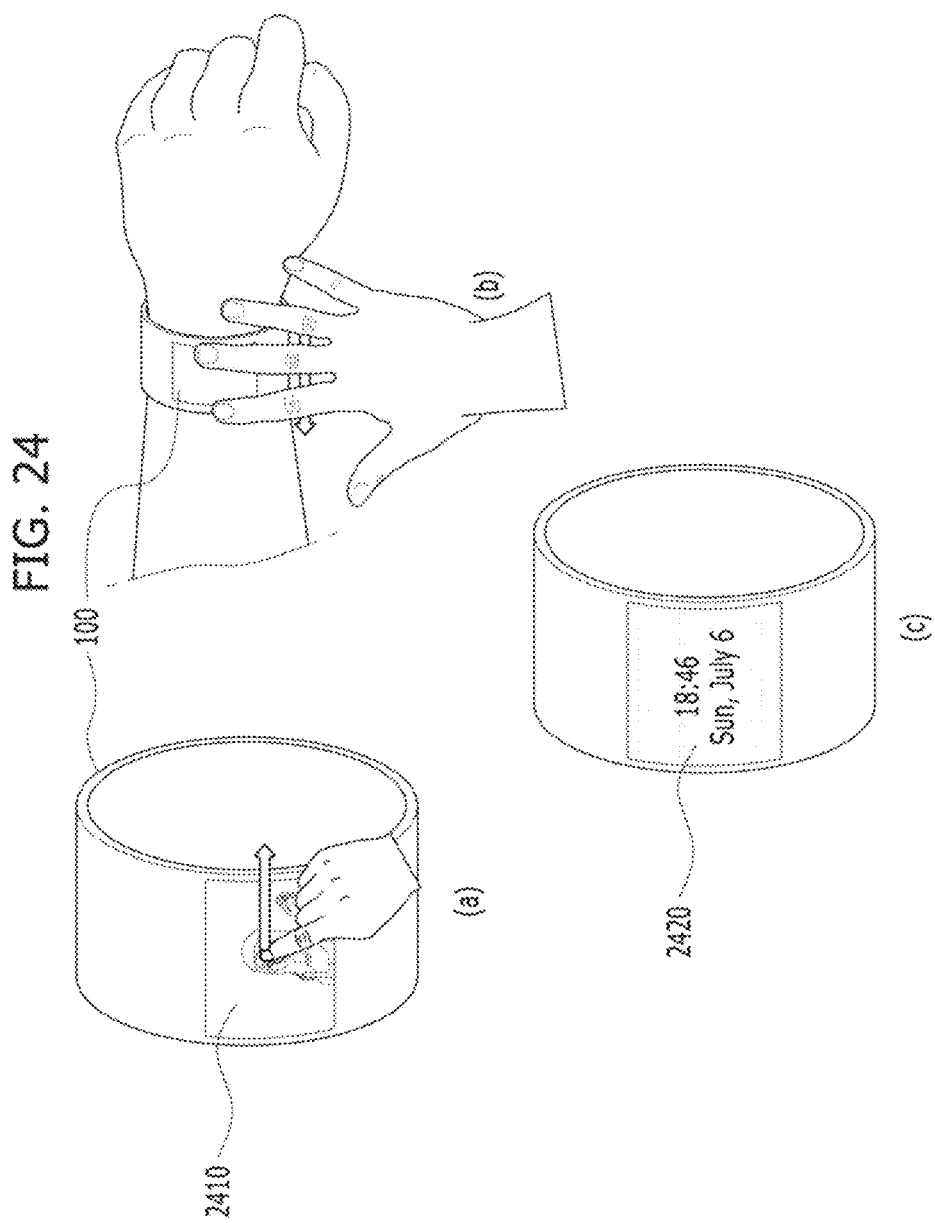
FIG. 24 is a diagram illustrating one example of a method of stopping an application in a mobile terminal according to one embodiment of the present invention.

In the following description, additional functions executable in a mobile terminal according to an embodiment of the present invention are explained in detail with reference to FIGS. 24 to 26. FIG. 24 is a diagram illustrating one example of a method of stopping an application in a mobile terminal according to one embodiment of the present invention.

Referring to FIG. 24, when a running screen 2410 of an application is displayed on a touchscreen, if a user inputs a touch-drag command to the running screen 2410 in an edge direction (FIG. 24(a)) or moves a palm in the edge direction while enclosing the touchscreen with the palm (i.e., if a touch input is detected from a predetermined area or more) (FIG. 24(b)), the corresponding application is stopped so that a standby screen 2420 can be displayed (FIG. 24(c)).

FIG. 25 is a diagram illustrating one example of a method of running a bookmarked application in a mobile terminal according to one embodiment of the present invention. Referring to FIG. 25, when a standby screen 2510 is displayed on a mobile terminal, if a touch input to a preset region around the standby screen 2510 is maintained over a prescribed time (FIG. 25(a)), an icon 2520 corresponding to an application set as a bookmarked application can be displayed (FIG. 25(b)).

Further, if a user rotates a wrist by maintaining a touch to the corresponding icon 2520 (FIG. 25(c)), a running screen 2530 of the application corresponding to the icon can be displayed on a region on which the standby screen was displayed (FIG. 25(d)). Of course, irrespective of the region on which the standby screen was displayed, according to settings, the running screen of the application corresponding to the icon can be displayed on a region in a size matching an extent of the rotation detected by a motion sensor in the course of maintaining the touch.

Figure 26:
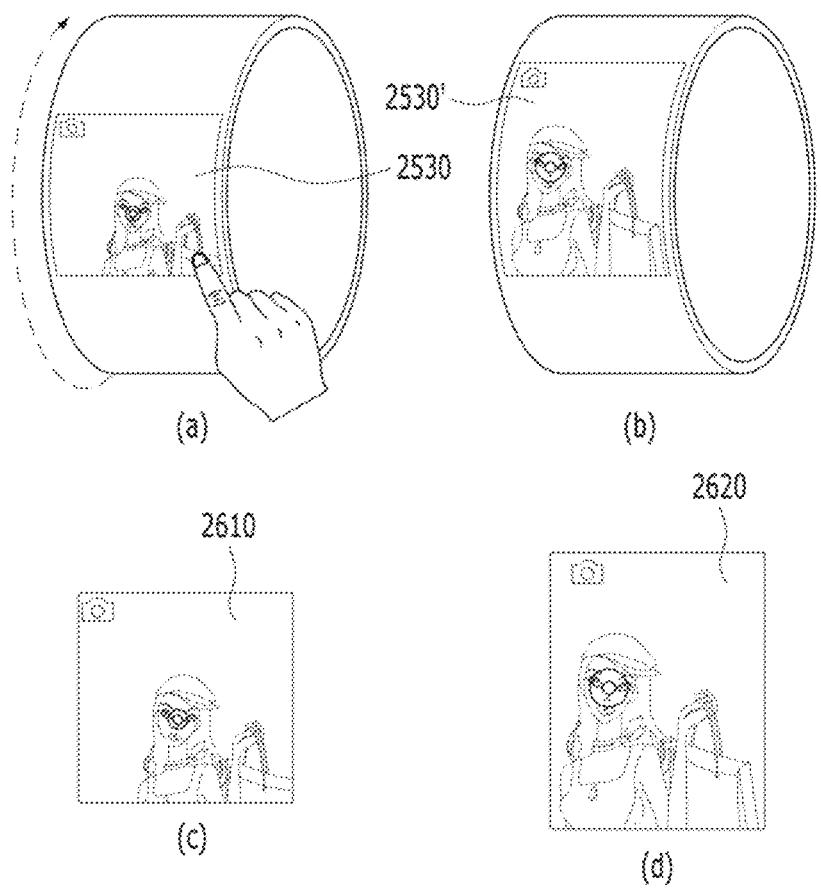
FIG. 26 is a diagram illustrating one example of a process for creating a content to correspond to a running screen of an application in a mobile terminal according to one embodiment of the present invention.

FIG. 26 is a diagram illustrating one example of a process for creating a content to correspond to a running screen of an application in a mobile terminal according to one embodiment of the present invention. Referring to FIG. 26(a), as a camera application is run, a preview screen 2530 is displayed on a touchscreen of a mobile terminal. Further, if a user rotates a wrist by maintaining a touch input to a bottom end of the preview screen 2530, a preview screen 2530' can be extended in a length direction (FIG. 26(b)). In this instance, when the preview image 2530 shown in FIG.

26(a) is displayed, if a shutter button is manipulated, an image 2610 shown in FIG. 26(c) can be taken. When the preview image 2530' extended in the length direction shown in FIG. 26(b) is displayed, if a shutter button is manipulated, an image 2620 shown in FIG. 26(d) can be taken. In particular, a size and aspect ratio of an image created as a result of the photographing may correspond to a size and aspect ratio of a preview image.

Meanwhile, besides the above-described command input methods, a method of inputting a rotation command while touching a touchscreen with at least two pointers (i.e., in multi-touch state) can be used. For instance, when such a method is applied to FIG. 10, if an extension of a display region is initiated by a multi-touch input, it can fix an extended region by cancelling the multi-touch input without applying a drag in a width direction shown in FIG. 10(b).

In another instance, when such a method is applied to FIG. 11, if an extension of a display region is initiated by a multi-touch input and a rotational distance only becomes equal to or greater than a predetermined distance (which is preferably shorter than the distance for the separation shown in FIG. 11), a separated display region can be directly displayed as a preset region, as shown in FIG. 11(d). Moreover, while the respective visual effects 1210 and 1220 are displayed in the situation that a touch-drag is applied with a single finger, as shown in FIG. 12, if another touch with one finger is further applied, a corresponding region can be directly separated. In this instance, a touch-drag input, which is going to be applied with two fingers by a rotation, can be recognized as an input for moving the separated region by the controller.

In another instance, when a scroll is performed at a first unit speed in the situation shown in FIG. 15(c), if a multi-touch is applied, a scroll can be performed at a second unit speed faster or slower than the first unit speed. In this instance, the second unit speed may be proportional to the number of pointers participating in the multi-touch.

In another instance, if both a multi-touch and a rotational input are simultaneously detected in the situation shown in FIG. 25(a), the step of paging the icon 2520 is skipped and the running screen 2530 of the corresponding application can be directly paged (FIG. 25(d)). In still another instance, if both a multi-touch and a rotational input are simultaneously detected in the situation shown in FIG. 26, a photographing can be initiated. Further, a direction faced by the camera is changed in response to a rotational direction when the wrist is rotated. Using such a direction change, images can be taken consecutively in response to the rotation of the wrist, by prescribed periods, or at each predetermined rotational angle. if the rotation exceeds a predetermined angle or the multi-touch is released, the corresponding photographing can be ended. Hence, the controller can create a panoramic image spread in the rotational direction by connecting the taken images together. In this instance, the photographing period may be variable depending on the rotational speed of the wrist. Once the photographing is initiated, a user can be provided with a feedback of sound or vibration by prescribed periods or at each predetermined rotational angle.

Accordingly, the present invention provides the following advantages. First, embodiments of the present invention provide various functions through a mobile terminal of a wearable type. Secondly, the present invention can input a command of a new type by combining a touch input with a motion of a wearable device attributed to a motion of a human body. Thirdly, the present invention can secure user's privacy by changing an information displayed display region or increasing readability of a specific portion of a display region only using a command input method of a new type.

According to one embodiment of the present invention, the above-described methods can be implemented in a program recorded medium as computer-readable codes. The computer-readable media include all kinds of recording devices in which data readable by a computer system are saved. The computer-readable media include ROM, RAM, CD-ROM, magnetic tapes, floppy discs, optical data storage devices, and the like for example and also include carrier-wave type implementations (e.g., transmission via Internet). In addition, the computer may include a controller 180 of a terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a wireless communication unit configured to provide wireless communication;
a touchscreen;
a motion sensor configured to detect a motion of the mobile terminal; and
a controller configured to:
display a first screen on a first region of the touchscreen,
receive a rotation of the mobile terminal detected through the motion sensor and a first touch-drag input performed by the rotation of the mobile terminal through the touchscreen, simultaneously, and
newly display a second screen on a second region of the touchscreen while maintaining displaying the first screen on the first region in response to the rotation of the mobile terminal and the first touch-drag input, the second screen including information about an event that has occurred on the mobile terminal,
wherein the second region is an extended region of the touchscreen corresponding to a distance of the first touch-drag input in a first direction,
wherein the extended region abuts the first region if the distance of the first touch-drag input is less than a predetermined distance,
wherein the extended region becomes spaced out from the first region in the first direction if the distance of the first touch-drag input is greater than a predetermined distance, and
wherein the controller is further configured to maintain displaying the second screen on the extended region when a second touch-drag input in a second direction is applied to the touchscreen.

2. The mobile terminal of claim 1, wherein the controller is further configured to:
display a first indicator indicating the event on the first screen, wherein the first touch-drag input is started from the first indicator, and
display event related information corresponding to the first indicator on the extended first screen.

3. The mobile terminal of claim 2, wherein the controller is further configured to:
sequentially display event related information for a plurality of events occurred on the mobile terminal in the extended first screen.

4. The mobile terminal of claim 1, wherein the controller is further configured to:

display information related to a subsequent event occurred on the mobile terminal having a same category of the event on second screen.

5. The mobile terminal of claim 1, wherein the controller is further configured to:
    display a graphic representation indicating a presence or non-presence of an arrival at the predetermined distance as the first touch-drag input proceeds.

6. The mobile terminal of claim 5, wherein the graphical representation is displayed between the first screen and the second screen.

7. The mobile terminal of claim 1, wherein the controller is further configured to:
    display a visual effect corresponding to the first touch-drag input.

8. The mobile terminal of claim 7, wherein the controller is further configured to:
    receive a third touch-drag input after the first touch-drag input is released, and
    stop displaying the visual effect regarding a region of the third touch-drag input.

9. The mobile terminal of claim 1, wherein the mobile terminal is a wearable bangle having the touchscreen arranged along an outer circumference of the wearable bangle.

10. A method of controlling a mobile terminal, the method comprising:
    displaying a first screen on a first region of a touchscreen;
    receiving a rotation of the mobile terminal detected through a motion sensor and a first touch-drag input performed by the rotation of the mobile terminal through the touchscreen, simultaneously; and
    newly displaying a second screen on a second region of the touchscreen while maintaining displaying the first screen on the first region in response to the rotation of the mobile terminal and the first touch-drag input, the second screen including information about an event that has occurred on the mobile terminal,
    wherein the second region is an extended region of the touchscreen corresponding to a distance of the first touch-drag input in a first direction,
    wherein the extended region abuts the first region if the distance of the first touch-drag input is less than a predetermined distance,
    wherein the extended region becomes spaced out from the first region in the first direction if the distance of the first touch-drag input is greater than a predetermined distance, and
    wherein the method further comprises maintaining displaying the second screen on the extended region when a second touch-drag input in a second direction is applied to the touchscreen.

11. The method of claim 10, further comprising:
    displaying a first indicator indicating the event on the first screen, wherein the first touch-drag input is started from the first indicator; and
    displaying event related information corresponding to the first indicator on the extended first screen.

12. The mobile terminal of claim 1, wherein the controller is further configured to display information related to a touch point of the first touch-drag input on the second screen.

13. The mobile terminal of claim 1, wherein the second region is extended from the first screen in the first direction of the first touch-drag input.

14. The mobile terminal of claim 1, wherein the controller is further configured to:
    execute a specific function corresponding to a combination of the rotation of the mobile terminal and the first touch-drag input, and
    display information related to the executed specific function on the second screen.

15. The method of claim 10, further comprising:
    displaying information related to a touch point of the first touch-drag input on the second screen.

16. The method of claim 10, wherein the second region is extended from the first screen in the first direction of the first touch-drag input.

17. The method of claim 10, further comprising:
    executing a specific function corresponding to a combination of the rotation of the mobile terminal and the first touch-drag input; and
    displaying information related to the executed specific function on the second screen.

18. The mobile terminal of claim 1, wherein the extended region becomes activated in response to the rotation of the mobile terminal and the first touch-drag input.

* * * * *